United States Patent [19]
Yanagi et al.

[11] Patent Number: 5,499,223
[45] Date of Patent: Mar. 12, 1996

[54] BEAM POSITION CONTROL SYSTEM OF AN OPTICAL DISK UNIT

[75] Inventors: Shigenori Yanagi, Kawasaki; Makoto Takayanagi, Tokyo; Kikuji Katoh, Tokorozawa, all of Japan

[73] Assignees: Fujitsu Limited, Kawasaki; Nippon Telegraph & Telephone Company, Tokyo, all of Japan

[21] Appl. No.: 456,388

[22] Filed: Jun. 1, 1995

Related U.S. Application Data

[63] Continuation of Ser. No. 859,469, Jun. 2, 1992, abandoned.

[30] Foreign Application Priority Data

| Oct. 3, 1990 | [JP] | Japan | 2-265719 |
| Oct. 3, 1990 | [JP] | Japan | 2-265722 |
| Oct. 3, 1990 | [JP] | Japan | 2-265723 |
| Oct. 3, 1990 | [JP] | Japan | 2-265724 |

[51] Int. Cl.⁶ ............................................. G11B 7/00
[52] U.S. Cl. ........................... 369/44.28; 369/44.29
[58] Field of Search ............................ 369/44.28, 44.27, 369/44.32, 44.34, 44.29, 54, 58, 47, 48, 50

[56] References Cited

FOREIGN PATENT DOCUMENTS

| 0387019 | 9/1990 | European Pat. Off. |
| 59-500243 | 2/1984 | Japan . |
| 61-104337 | 5/1986 | Japan . |
| 63-44327 | 2/1988 | Japan . |
| 2-81327 | 3/1990 | Japan . |
| 2-240838 | 9/1990 | Japan . |
| 2-5226 | 10/1990 | Japan . |
| 2-5225 | 10/1990 | Japan . |

*Primary Examiner*—Georgia Y. Epps
*Assistant Examiner*—P. W. Huber
*Attorney, Agent, or Firm*—Staas & Halsey

[57] ABSTRACT

This invention enables one, or both, or none of position servo control and position lock control of a galvanomirror, to control a read beam to an optimum position under any of on-track state, seek state, position setting state after the completion of a seek operation, and positional deviation existing state between a write beam and the read beam. The invention locks the position of the galvanomirror when a unit is energized or retried, reads a galvanomirror position signal provided at this moment, finds an offset signal for zeroing the galvanomirror position signal, and adds the offset to the position locked galvanomirror during a seek operation with the write beam, thereby removing an offset of the galvanomirror position signal. The invention determines that the galvanomirror has been abnormally deflected due to a malfunction of a tracking control servo system, upon detecting an abnormality that a tracking error signal used for the tracking control of the read beam exceeds a threshold value and an abnormality that a galvanomirror position signal used for locking the galvanomirror at a central position exceeds a threshold value. The invention removes an offset by adding the galvanomirror position signal to the tracking error signal of the read beam. It is possible to add a lens position signal as well to remove the offset. (FIG. 1B)

16 Claims, 30 Drawing Sheets

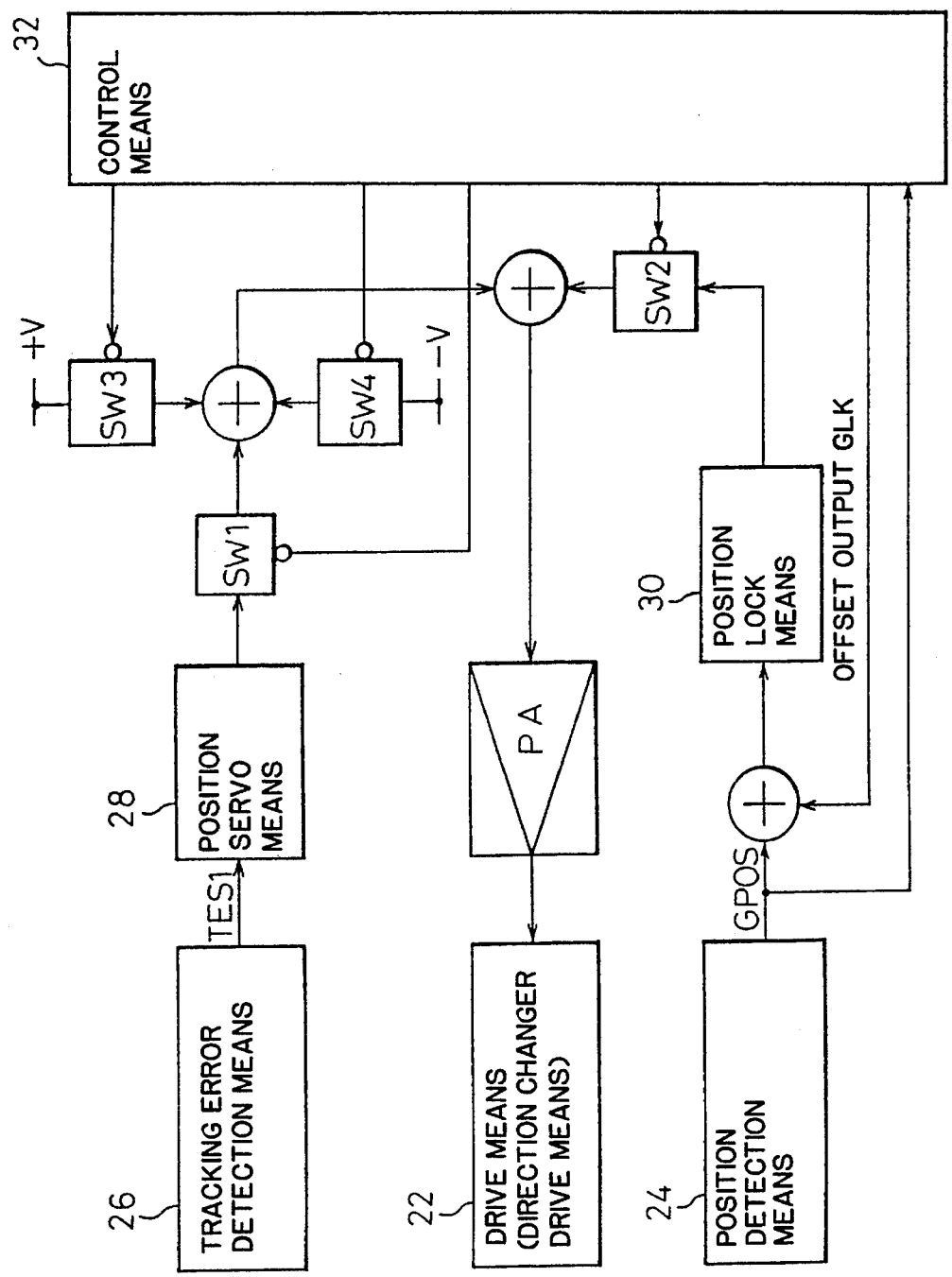

5,499,223

BEAM POSITION CONTROL SYSTEM OF AN OPTICAL DISK UNIT

This application is a continuation of application Ser. No. 07/859,469, filed Jun. 2, 1992, now abandoned.

TECHNICAL FIELD

This invention relates to a beam position control system of an optical disk unit for emitting a write beam and a read beam onto a medium through an object lens, and particularly, to a beam position control system of an optical disk unit employing a galvanomirror for an independent tracking operation with a read beam or a write beam.

BACKGROUND ART

An optical disk unit passes write and read beams through an object lens, to immediately read (verify) a medium while writing the medium.

In this case, a lens actuator of the optical disk unit moves the write and read beams together to trace a track on the medium, and a galvanomirror drives the read beam to let it follow the track independently of the write beam. Position servo control of the read beam during the independent tracking operation is carried out according to a tracking error signal of the read beam. For suppressing unwanted movements of the galvanomirror due to disturbing vibration, position lock control for maintaining the galvanomirror at a central position is carried out according to a galvanomirror position signal.

Here, a zero point of the tracking error signal does not always agree with a zero point of the galvanomirror position signal. If the position servo control and position lock control are simultaneously carried out under this condition, opposite forces may be applied to the actuator due to the disagreement of the zero points, to produce a servo reminder (incomplete servo) and a track error after a track jump. It is required, therefore, to properly control the position of the read beam by effectively combining the position servo control according to the tracking error signal and the position lock servo control according to the galvanomirror position signal.

Tension of cables, etc., connected to the galvanomirror causes a stop point of the position lock control to deviate from a zero point of the galvanomirror position signal. Even if a servo gain of the galvanomirror is adjusted in a manufacturing stage such that the write and read beams are positioned on the same track, the gain may change through aging, to change the stop point of the read beam with the position locked galvanomirror during a seek operation. If this happens, the read beam may be positioned at a different track from a track of the write beam after the seek operation. Then, a corrective seek operation must be done for the read beam. It is necessary, therefore, to provide a read beam control system that can maintain an adjusted state of correctly positioning the read beam onto the same track as the write beam after the completion of a seek operation, even if the galvanomirror has a mechanical offset.

If a servo system malfunctions during the tracking control, the galvanomirror will be abnormally deflected to zero the tracking error signal to indicate that there is no track error. In this case, the servo error will never be detected. It is required, therefore, to detect the abnormal deflection of the galvanomirror and carry out a proper restoration process.

The tracking error signal obtained from the read beam in response to the position of the galvanomirror may have an offset, which may cause the read beam to be off-track. It is required, therefore, to remove the offset depending on the position of the galvanomirror.

SUMMARY OF THE INVENTION

This invention relates to a beam position control system of an optical disk unit for emitting a write beam and a read beam onto a medium through an object lens and carrying out tracking control of the read beam with a galvanomirror.

An object of the invention is to prevent a tracking error of the read beam due to a conflict between position servo control and position lock control in the galvanomirror, which serves as beam direction change means, and improve stability against disturbing vibration.

Another object of the invention is to remove a mechanical offset of the galvanomirror and let the read beam correctly follow a seek operation of the write beam, to shorten an access time of the write and read beams.

Still another object of the invention is to detect and deal with an abnormal deflection of the galvanomirror due to a malfunction of a servo system for carrying out the tracking control of the read beam.

An object of the invention is to remove an offset of a tracking error signal of the read beam, the offset being caused depending on the position of the galvanomirror.

An aspect of the invention enables one, or both, or none of the position servo control and the position lock control of the galvanomirror, to control the read beam to an optimum position under any of on-track state, seek state, position setting state after the completion of a seek operation, and positional deviation existing state between the write beam and the read beam.

Another aspect of the invention locks the position of the galvanomirror when the unit is energized or retried, reads a galvanomirror position signal provided at this moment, finds an offset signal for zeroing the galvanomirror position signal, and adds the offset to the position locked galvanomirror during a seek operation with the write beam, thereby removing an offset of the galvanomirror position signal.

Still another aspect of the invention determines that the galvanomirror has been abnormally deflected due to a malfunction of the tracking control servo system, if detecting an abnormality that a tracking error signal used for the tracking control of the read beam exceeds a threshold value and an abnormality that a galvanomirror position signal used for locking the galvanomirror at a central position exceeds a threshold value.

Still another aspect of the invention removes an offset by adding a galvanomirror position signal to a tracking error signal of the read beam. It is possible to add a lens position signal as well to remove the offset.

BRIEF DESCRIPTION OF THE DRAWINGS

FIG. 1B is a schematic view showing a principle of an aspect of the invention;

DESCRIPTION OF THE PREFERRED EMBODIMENTS

Before explaining one aspect of the invention shown in FIG. 1B, a fixed optical system and a movable optical system of a conventional two-beam optical head will be explained with reference to FIG. 15.

Figure 15:
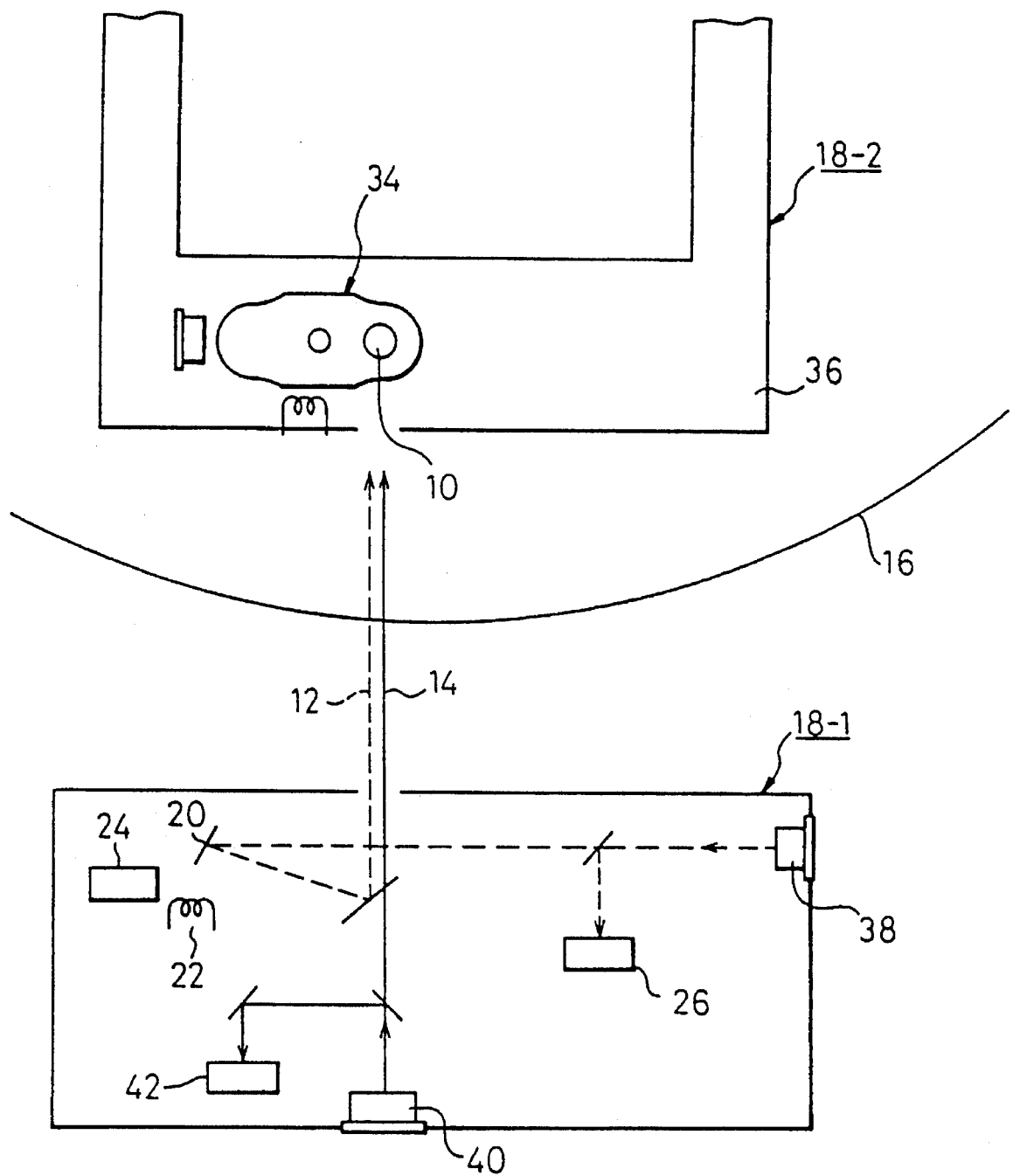
FIG. 15 is a schematic view showing a prior art two-beam optical head.

In FIG. 15, numeral 16 is a medium (for example, a magneto-optic disk). For this magneto-optic disk 16, there are arranged the fixed optical system 18-1 and movable optical system 18-2 mounted on a carriage that is freely moved across tracks by, for example, a VCM positioner.

The fixed optical system 18-1 has a semiconductor laser 38 for reading and a semiconductor laser 40 for writing. A read beam 12 from the semiconductor laser 38 is reflected by a galvanomirror 20 disposed in a reading optical system, passed through an object lens 10 of a lens actuator 34 of the movable optical system 18-2, and emitted onto the magneto-optic disk 16. A return beam from the magneto-optic disk 16 is passed through the reading optical system and made incident to a tracking error detector 26 employing a two-piece light receiving element for detecting a tracking error.

On the other hand, a write beam 14 from the writing semiconductor laser 40 is passed through the object lens 10 of the movable optical system 18-2, and emitted onto the magneto-optic disk 16. A return beam therefrom is made incident to a tracking error detector 42 employing a two-piece light receiving element for detecting a tracking error.

The galvanomirror 20 is turned by an actuator coil 22 serving as mirror driving means, to move the read beam 12 across tracks. The position of the galvanomirror 20 is detected by a position detector 24.

Figure 16:
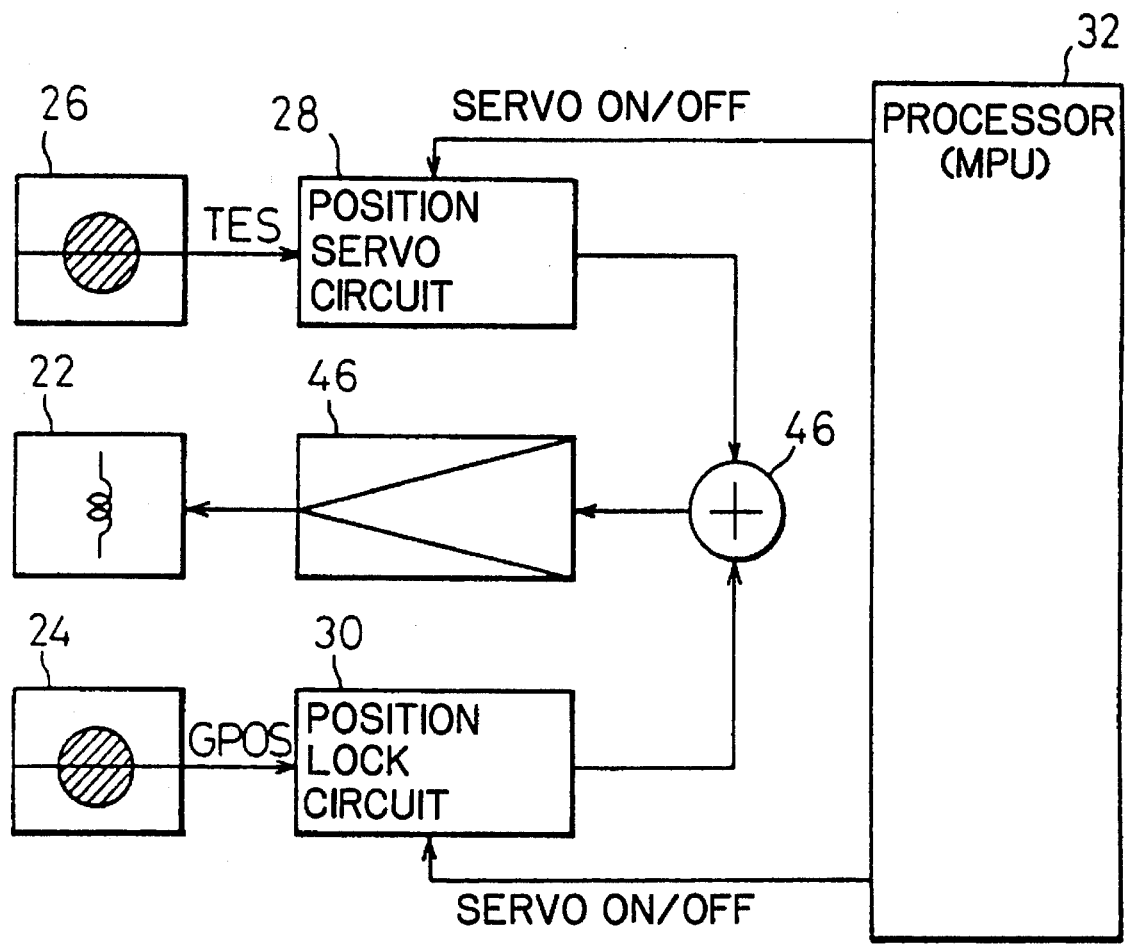
FIG. 16 is a schematic view showing a conventional read beam position control system for the two-beam optical head shown in FIG. 15.

FIG. 16 is a schematic diagram showing a read beam position control system for the two-beam optical head shown in FIG. 15.

In FIG. 16, a position servo loop for carrying out tracking control of the read beam according to the tracking error signal comprises the tracking error detector 26, a position servo circuit 28, an adder 44, a power amplifier 46, and the actuator coil 22. This loop controls the position of the beam by zeroing a tracking error signal TES, thereby keeping the read beam on a track. A position lock loop for keeping the galvanomirror 20 at its neutral position according to the galvanomirror position signal comprises the position detector 24, a position lock circuit 30, the adder 44, the power amplifier 46, and the actuator coil 22. This loop locks the galvanomirror 20 at the neutral position by zeroing a position signal GPOS even if there is disturbing vibration.

According to the read beam position control system, the position servo control (tracking control) according to the tracking error signal TES and the galvanomirror position lock control according to the galvanomirror position signal GPOS may interfere with each other so that, when the position of the read beam is controlled, a zero point of the tracking error signal TES for the on-track control does not always agree with a zero point of the position signal GPOS for the neutral control. This disagreement of the zero points may apply opposite forces to the galvanomirror 20. For example, when the actuator coil 22 is driven to zero the tracking error signal TES, the position signal GPOS, which has been at the zero point at the moment, may be increased, so that another opposite force must be applied to zero the position signal GPOS. This may produce a servo remainder (incomplete servo) when the beam is set on a target track after a track jump, to cause a track jump error.

To solve the problem, an object of the one aspect of the invention is to provide a beam position control system of an optical disk unit, which prevents a read beam's tracking error due to a conflict between the position servo control and the position lock control of the galvanomirror, thereby improving stability against disturbing vibration.

The one aspect of the invention will be explained in detail.

Figure 1A:
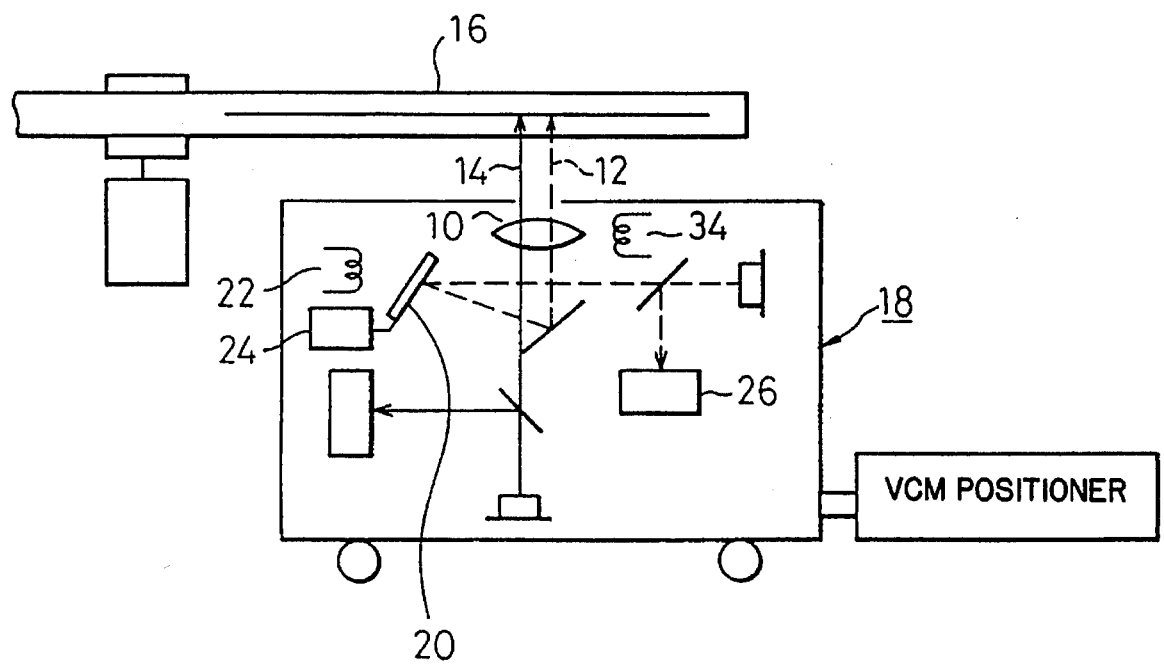
FIG. 1A is a schematic view showing essential part of an optical head according to the invention.

FIG. 1A shows essential part of an optical head according to the invention, and FIG. 1B shows a principle of the one aspect of the invention.

The invention is applied for an optical disk unit of the following arrangement.

Namely, the optical disk unit to which the invention is applied comprises:

an optical head 18 for passing at least two beams including a read beam 12 and a write beam 14 through a single object lens 10, and simultaneously writing and reading data to and from a medium 16 with a plurality of the beams;

lens drive means 34 for driving the object lens 10 for simultaneously moving the beams across tracks of the medium;

galvanomirror drive means (direction changer drive means) 22 for driving a galvanomirror 20 serving as beam direction change means, to move the read beam 12 across the tracks of the medium;

position detection means 24 for detecting the position of the galvanomirror 20 and providing a position signal (GPOS);

tracking error detection means 26 for providing a tracking error signal (TES1) detected according to a return beam of the read beam 12 from the medium;

position servo means 28 for driving the galvanomirror 20 according to the tracking error signal (TES1), to carry out tracking control of the read beam 12; and position lock means 30 for keeping the galvanomirror 20 at a predetermined position according to the galvanomirror position signal (GPOS).

A beam position control system according to the one aspect of the invention for such an optical disk unit comprises a first servo switch SW1 for starting and stopping the position servo operation of the position servo means 28, a second servo switch SW2 for starting and stopping the position lock operation of the position lock means 30, and control means 32 for turning ON and OFF the first and second servo switches SW1 and SW2 according to a beam position control state, to enable one, or both, or none of the position servo operation and position lock operation.

More precisely, the system has the following modes 1 to 6.

[Mode 1]

When the first servo switch SW1 is OFF to disable the position servo operation, the control means 32 turns ON the second servo switch SW2 to enable the position lock operation.

[Mode 2]

When a seek operation with the read beam 12 is completed and the read beam 12 is to be set on a target track, the control means 32 turns ON the first and second servo switches SW1 and SW2 to enable both the position servo operation and position lock operation, and once the beam is set on the track, turns OFF the second servo switch SW2 to carry out the position servo operation alone.

[Mode 3]

When the write beam 14 alone is jumped across tracks during the position servo operation of the read beam 12, the control means 32 turns OFF the servo switch SW1 to disable both the position servo operation of the read beam 12 and the position lock operation and leave the galvanomirror 20 uncontrolled until the jump is completed.

[Mode 4]

For this mode 4, a third servo switch SW3 for applying a forward drive signal (+V) to the galvanomirror drive means 22 and a fourth servo switch SW4 for applying a reverse drive signal (–V) to the same are newly arranged.

When the read beam 12 alone is jumped during the position servo operation of the read beam 12, the control means 32 turns OFF the servo switches SW1 and SW2 to disable both the position servo operation and position lock operation, and controls the third servo switch SW3 or the fourth servo switch SW4.

[Mode 5]

While carrying out the position servo operation of the read beam 12 with the servo switch SW1 being ON, the control means 32 fetches the position signal (GPOS) from the position detection means 24, and finds an offset signal (GLK) such that the position signal (GPOS) is unchanged when the servo switch SW2 is turned ON to lock the position of the galvanomirror.

When the write beam 14 alone is jumped across tracks, the control means 32 turns OFF the servo switch SW1 to disable the position servo operation of the read beam 12 until the completion of the jump, and at the same time, applies the offset signal (GLK) to lock the position of the galvanomirror 20 at an offset state. This causes no change in relative positions of the read and write beams.

When the track jump is completed, the control means 32 turns OFF the second servo switch SW2, and ON the first servo switch SW1 to resume the position servo operation.

[Mode 6-1]

Similar to the mode 4, a third servo switch SW3 for applying a forward drive signal (+V) to the galvanomirror drive means 22 and a fourth servo switch SW4 for applying a reverse drive signal (–V) to the same are arranged.

When an immediate read operation is carried out during a write operation, a higher device may provide a seek instruction indicating differences for positional deviations of the read beam 12 and write beam 14. If the difference for the write beam 14 indicated in the seek instruction is zero, the control means 32 turns OFF the servo switch SW1 to disable both the position servo operation of the read beam 12 and the position lock operation, and controls the third servo switch SW3 or the fourth servo switch SW4.

[Mode 6-2]

When an immediate read operation is carried out during a write operation, the higher device may provide a seek instruction indicating differences for positional deviations of the read beam 12 and write beam 14. If the difference for the write beam 14 indicated in the seek instruction is not zero, the control means 32 turns ON the servo switch SW1 to enable the position servo operation of the read beam 12, reads the position signal (GPOS) from the position detection means 24, finds an offset with which the position signal (GPOS) is unchanged under a position locked state, and adds this offset to another offset corresponding to a positional difference between the write beam and the read beam, to form an offset signal (GLK) for locking the galvanomirror such that the read beam can be moved while keeping a relative distance from the write beam.

Thereafter, the control means 32 turns OFF the servo switch SW1 to disable the position servo operation of the read beam 12 during the track jump operation of the write beam 14, and applies the offset signal (GLK) previously obtained to lock the position of the galvanomirror to an offset state.

Lastly, the control means 32 turns OFF the second servo switch SW2 after the completion of the track jump, and turns ON the servo switch SW1 to resume the position servo operation.

The beam control system for the optical disk unit according to the one aspect of the invention having the above arrangement enables one, or both, or none of the position servo control and the position lock control of the galvanomirror, to control the read beam to an optimum position under any of on-track state, seek state, position setting state after a seek operation, and positional deviation existing state between the write and read beams. Even if a zero point of the tracking error signal TES does not agree with that of the galvanomirror position signal GPOS, the invention can precisely set the read beam on a target track after a track jump operation without causing a servo remainder of the read beam. Also, the invention surely prevents an unnecessary movement of the galvanomirror due to disturbing vibration and stably controls the position of the read beam.

Figure 2:
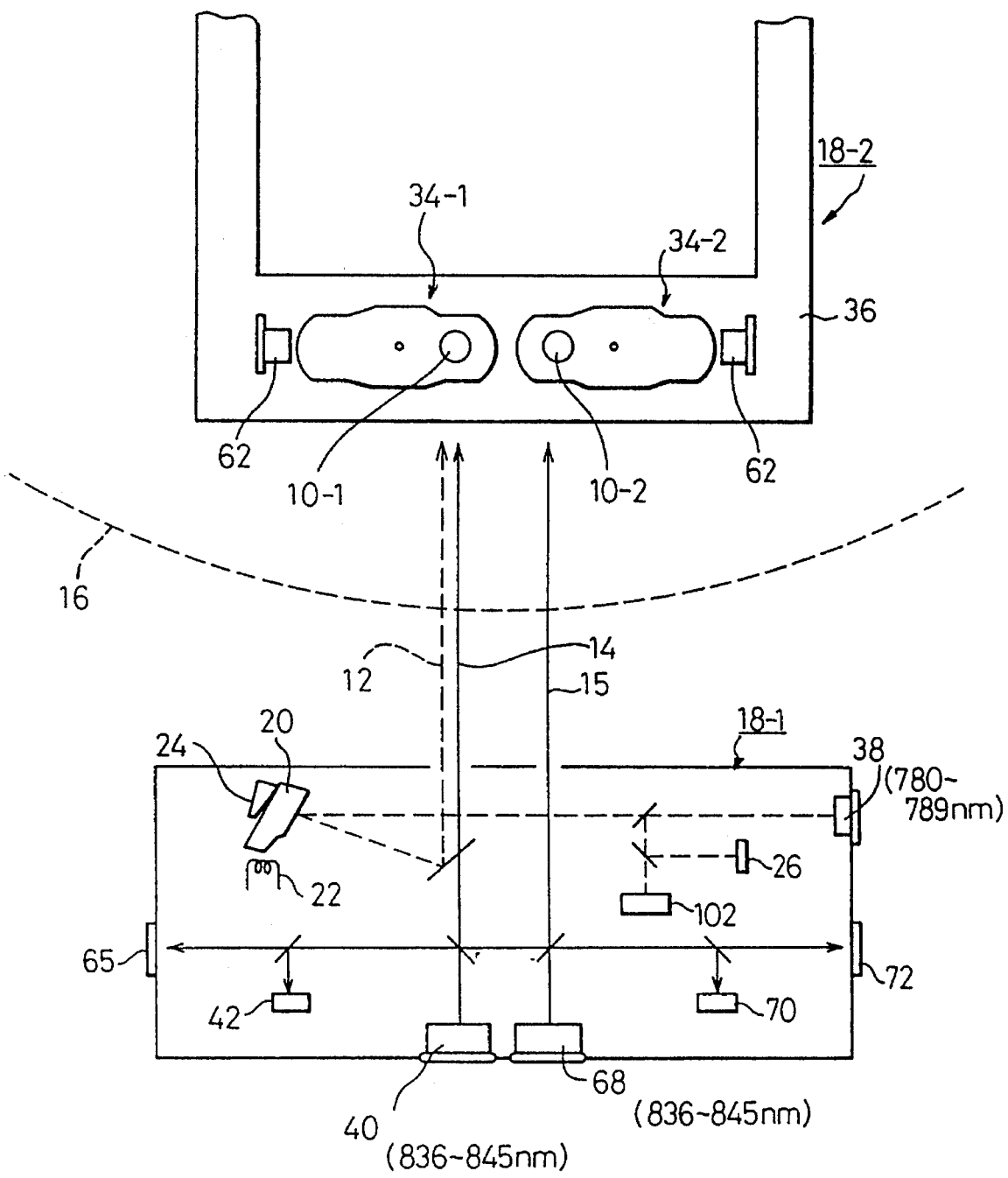
FIG. 2 is a schematic view showing fixed and movable optical systems of the optical head according to the invention.

FIG. 2 is a plan explanatory view showing an optical head used for an optical disk unit according to the invention. A medium is a magneto-optic disk.

In FIG. 2, the optical head comprises a fixed optical system 18-1 fixed to a frame, and a movable optical system 18-2 mounted on a carriage 36 moved by a VCM positioner across tracks of the magneto-optic disk 16.

The fixed optical system 18-1 includes a semiconductor laser 38 for emitting a read beam 12 having a wavelength of 780 to 789 nm, a semiconductor laser 40 for emitting a write beam 14 having a wavelength of 836 to 845 nm, and a semiconductor laser 180 for emitting an erase beam 15 having a wavelength of 836 to 845 nm, which is the same as that of the write beam.

The read beam 12 from the semiconductor laser 38 advances toward the movable optical system 18-2 through a galvanomirror 20, passes through an object lens 10-1 of a lens actuator 34-1 mounted on the carriage 36, and irradiates the magneto-optic disk 16. A return beam of the read beam 12 from the magneto-optic disk 16 passes through the object lens 10-1 and returns to the fixed optical system 18-1. The return beam is reflected by the galvanomirror 20, split, and made incident to a tracking error detector 26 employing a two-piece light receiving element for detecting a tracking error signal TES1 and simultaneously reproducing a signal RF1 from the read beam. The return beam is also made incident to a photosensor 102 for reproducing a signal RF2.

The write beam 14 from the semiconductor laser 40 advances through the fixed optical system 18-1, passes through the object lens 10-1 mounted on the lens actuator 34-1 of the movable optical system 18-2, and irradiates the magneto-optic disk 16. A return beam from the magneto-optic disk 16 passes through the same route and returns to the fixed optical system 18-1. The return beam is split and made incident to a tracking error detector 42 for detecting a tracking error signal TES2 and to a photosensor 65 for detecting a focus error signal FES1.

The erase beam 15 from the semiconductor laser 180 passes through an object lens 10-2 of an erasing lens actuator 34-2 that is separately disposed on the carriage 36 of the movable optical system 18-2, and irradiates the magneto-optic disk 16. A return beam therefrom is separated in the fixed optical system 18-1 and made incident to a tracking error detector 70 for detecting an erase tracking error signal TES3 and to a photosensor 72 for detecting a focus error signal FES2.

The lens actuators 34-1 and 34-2 mounted on the carriage 36 of the movable optical system 18-2 are, in this embodiment, two-dimensionally rocking lens actuators that can move the object lenses 10-1 and 10-2 in two directions., i.e., a direction across tracks of the magneto-optic disk 16 and a direction to and away from a face of the disk.

Figure 4:
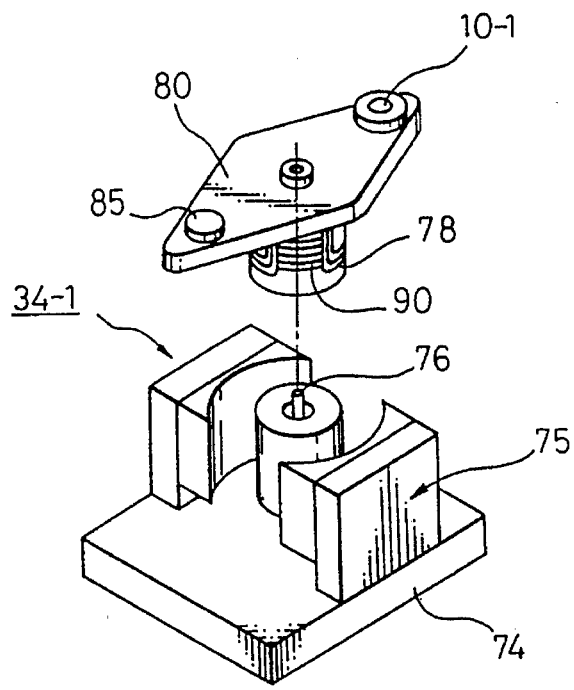
FIG. 4 is an exploded view showing a lens actuator according to the invention.

FIG. 4 is an exploded view showing the lens actuator 34-1 of FIG. 2. It comprises a base 74, a magnetic circuit 75 fixed on the base 74, and an upright slide shaft 76 disposed at the center of the magnetic circuit 75. With respect to this fixed portion on the base 74, a movable portion is a rotary arm 80. The rotary arm 80 has a lower cylindrical portion around which a tracking coil 78 and a focus coil 90 are arranged. One end of the rotary arm 80 has the object lens 10-1, and the other end a balance weight 85. A center hole of the rotary arm 80 engages with the slide shaft 76 of the base 74. The rotary arm 80 is turned around and slid along the shaft.

Figure 5:
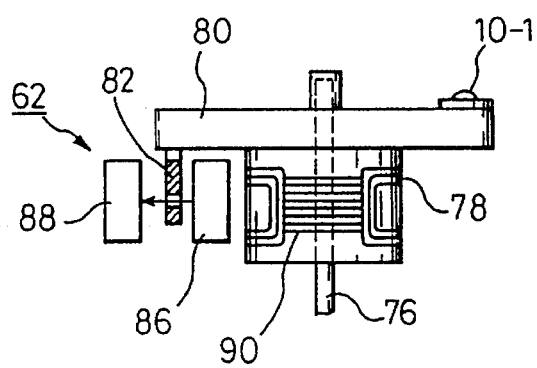
FIG. 5 is an explanatory view showing a rotary side of the actuator of FIG. 4.

FIG. 5 shows movable part of FIG. 4 and a lens position detector 62 for detecting a turned quantity of the lens actuator 34-1 in a turning direction relative to a neutral position of the lens actuator. The rotary arm 80 has a slit plate 82 at a lower end face opposite to the object lens 10-1. A light emitting portion 86 is fixed on the inner side of the slit plate. Light from the light emitting portion 86 passes through a slit of the slit plate and is received by a two-piece photosensor 88. When the rotary arm 80 is at its neutral position, two light receiving portions of the two-piece photosensor 88 receive an equal quantity of light. When the rotary arm 80 is turned, the light receiving quantity of one of the light receiving portions on a leading side increases, while that of the other decreases. Accordingly, a lens position signal LPOS is obtained as a differential signal of the two light receiving portions.

The details of the head optical system of FIG. 2 will be explained with reference to FIG. 3.

Firstly, the head optical system for the read beam 12 will be explained. The semiconductor laser 38 provides a beam, which is converted into a coherent beam by a collimator lens 92. A prism 93 changes the direction of the coherent beam, which is passed through a beam splitter 94, and made incident to the galvanomirror 20. The beam is reflected by the galvanomirror 20 and by a dichroic mirror 96, passed through the object lens 10-1 of the movable optical system of FIG. 2, and made incident to the magneto-optic disk 16. A return beam from the magneto-optic disk 16 is reflected by the dichroic mirror 96 and galvanomirror 20, and made incident to the beam splitter 94, which reflects the beam in an orthogonal direction. The beam is then made incident to a polarization beam splitter 98, which splits the beam into two parts for the tracking error detector 26 and for the photosensor 102. The tracking error detector 26 provides the tracking error signal TES1 and signal RF1 based on the read beam 12 according to a push-pull method (a far field method). The photosensor 102 provides the signal RF2. A subtraction of the signals RF1 and RF2 provided by the tracking error detector 26 and photosensor 102 provides a reproduced magneto-optic signal MO, and an addition thereof provides an ID signal indicting an intensity due to irregularities of a preformat portion. Namely, the magneto-optic signal MO and preformat ID signal are obtained as follows:

MO=RF1−RF2

ID=RF1+RF2

Next, the optical system for the write beam 14 will be explained.

The semiconductor laser 40 emits a pulse beam according to a data bit of 1 or 0. The beam is converted into a coherent beam by a collimator lens 108, passed through a polarization beam splitter 110, a λ/4 plate 112, a color correction prism (CCP) 114, and the dichroic mirror 96, and provided to the object lens 10-1 of the movable optical system of FIG. 2. The beam is then passed through the object lens 10-1 and emitted to the magneto-optic disk 16. A return beam from the magneto-optic disk 16 is passed through the same route, made incident to the polarization beam splitter 110, reflected by the polarization beam splitter 110 in an orthogonal direction, passed through a low-pass filter 115, and made incident to a Foucault optical unit 116. The Foucault optical unit 116 is for providing a focus error signal FES1 according to Foucault's method. The beam from the Foucault optical unit 116 is made incident to the photosensor 65, which provides the focus error signal FES1 for the write beam 14 as well as an ID signal corresponding to a light intensity determined by irregularities of a track preformat. The return beam of the write beam 14 reflected by the Foucault optical unit 116 in an orthogonal direction is provided to the tracking error detector 42, which provides the tracking error signal TES2 of the write beam 14 according to the push-pull method (far field method). The reason why the low-pass filter 115 is disposed is because, when an immediate reading operation with the read beam is carried out during a write operation, the magneto-optic disk 16 provides a return beam of the write beam 14 as well as a return beam of the read beam 12. Accordingly, the low-pass filter 115 passes only the return beam of the write beam 14 having a longer wavelength and blocks the return beam of the read beam 12 having a shorter wavelength.

Next, the optical system for the erase beam 15 will be explained.

The semiconductor laser 180 provides a beam, which is converted into a coherent beam by a collimator lens 118. The coherent beam is passed through a polarization beam splitter 120 and a λ/4 plate 122, and provided to the object lens 10-2 of the movable optical system of FIG. 2, to irradiate the magneto-optic disk 16. A return beam from the magneto-optic disk 16 is reflected by the polarization beam splitter 120 in an orthogonal direction, passed through a Foucault optical unit 124, and made incident to the photosensor 72. The photosensor 72 provides a focus error signal FES2 for the erase beam 15 as well as an ID signal corresponding to a light intensity of a track preformat portion. The return beam separated by the Foucault optical unit 124 is made incident to the tracking error detector 70, which provides a tracking error signal TES3 of the erase beam 15 according to the push-pull method (far field method).

Figure 6:
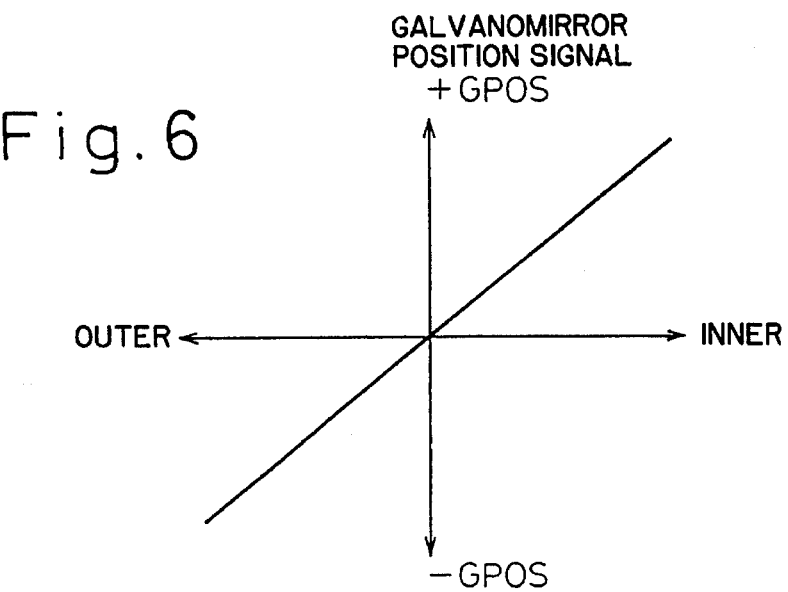
FIG. 6 is a view showing characteristics of a galvanomirror position signal according to the invention.

The position detector 24 for detecting the position of the galvanomirror 20 disposed in the optical system for the read beam 12 comprises a semiconductor laser 104, a collimator lens 105, and a two-piece photosensor 106. The semiconductor laser 104 emits a beam, which is converted into a cylindrical beam by the collimator lens 105, reflected by the back face of the galvanomirror 20, and made incident to the two-piece photosensor 106. Similar to the two-piece photosensor 88 of the lens actuator of FIG. 5, the two-piece photosensor 106 has two photosensors, which receive an equal quantity of light when the galvanomirror 20 is at its neutral position. When the galvanomirror 20 is turned, the quantity of light on one of the photosensors on a leading side increases, while that of the other decreases. Accordingly, the galvanomirror position signal GPOS is detected as a difference of the outputs of the two photosensors. As shown in FIG. 6 as an example, the position signal positively increases when the read beam 12 is moved toward the inner side of the magneto-optic disk, and negatively increases when the beam is moved toward the outer side of the disk.

Figure 3:
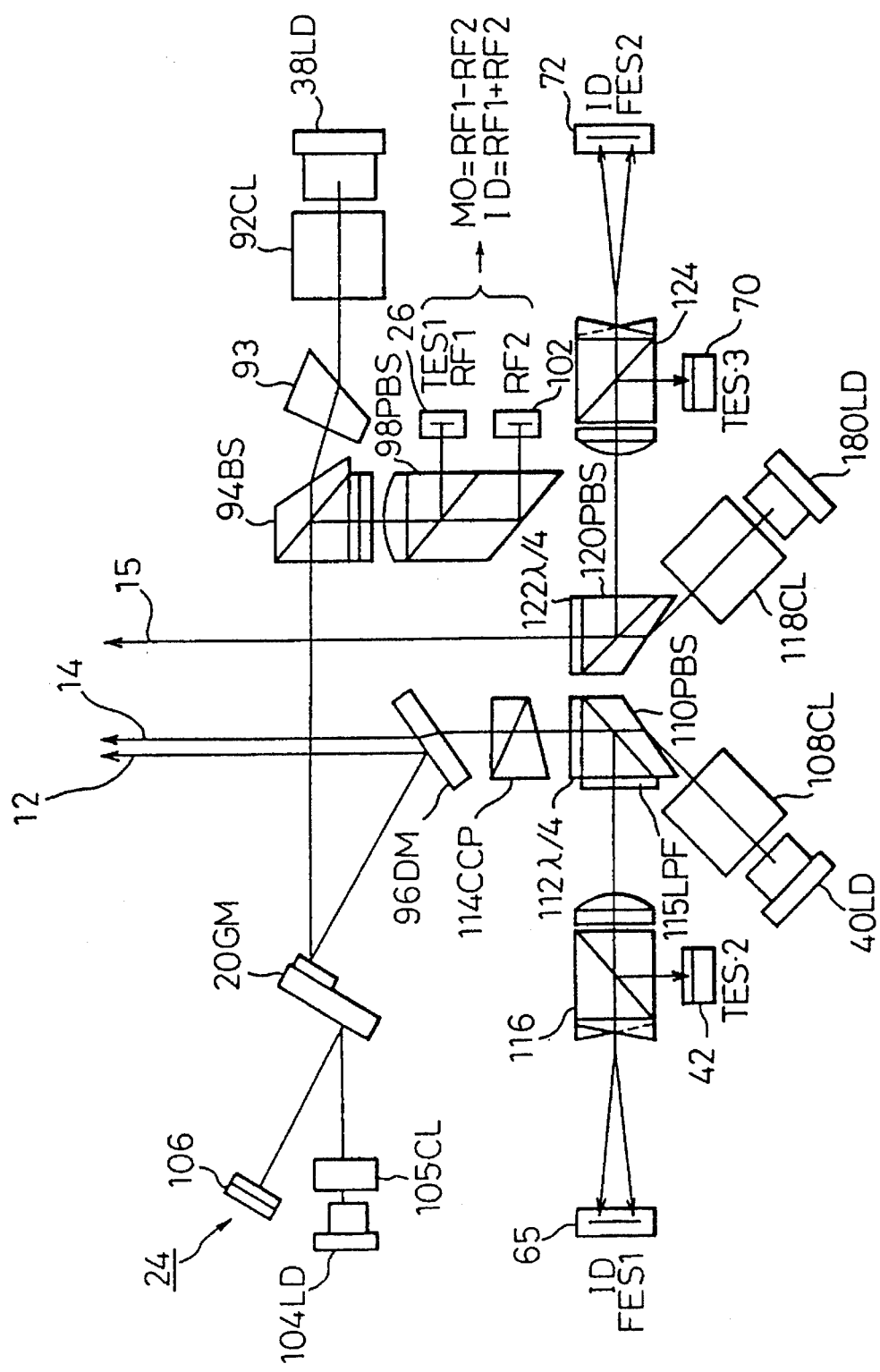
FIG. 3 is a schematic view showing a head optical system according to the invention.
Figure 7:
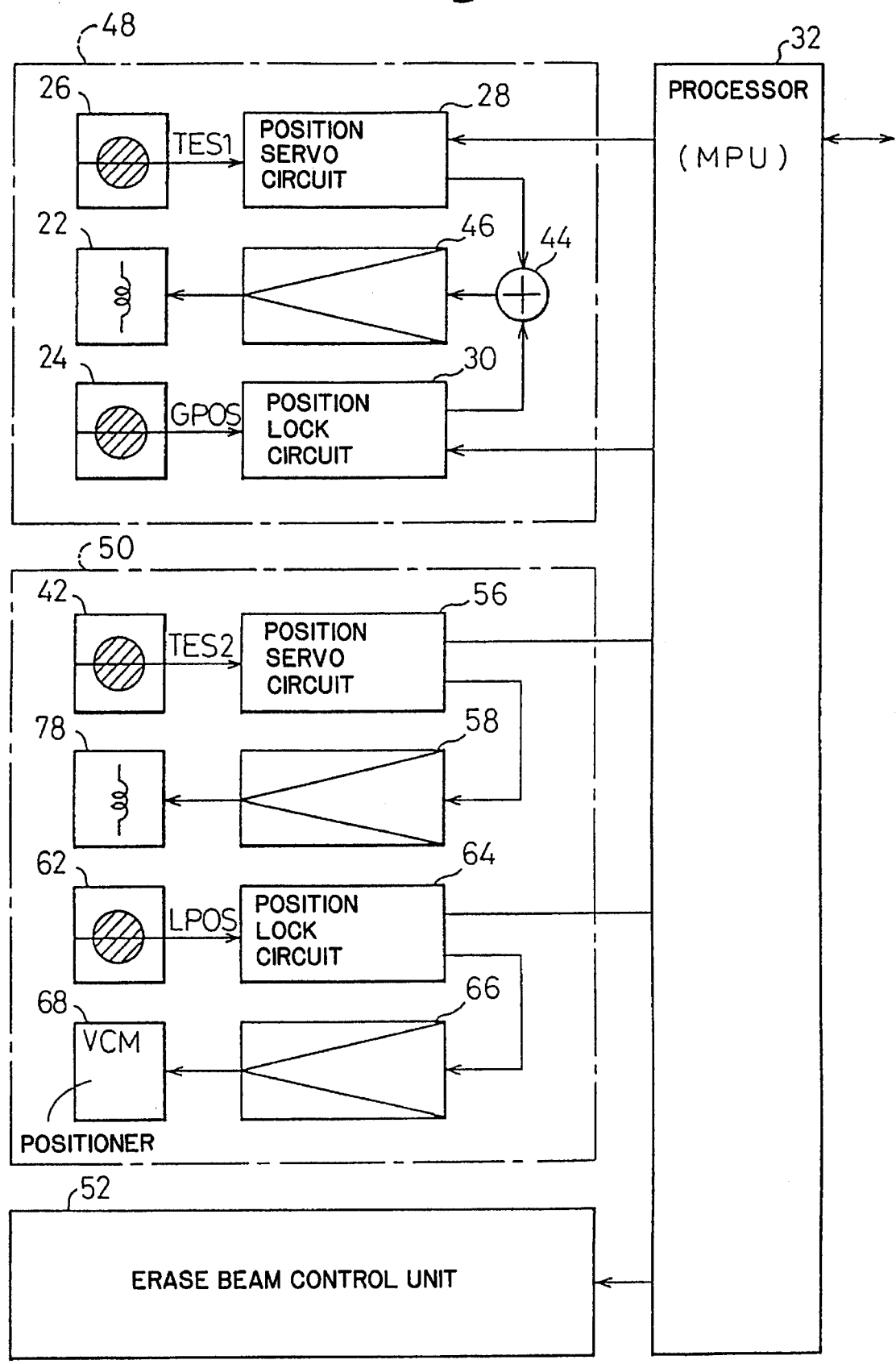
FIG. 7 is a general schematic view showing beam position control according to the invention of FIG. 1B.

FIG. 7 is a general schematic view showing a control portion for controlling the positions of the read beam 12, write beam 14, and erase beam 15 in the optical head of FIGS. 2 and 3.

In FIG. 7, a read beam control portion 48 is arranged for the read beam 12, a write beam control portion 50 for the write beam 14, and an erase beam control portion 52 for the erase beam 15.

The read beam control portion 48 carries out servo control of the actuator coil 22 for driving the galvanomirror 20, which serves as direction change means for changing the direction of the beam according to the tracking error signal TES1 from the tracking error detector 26 and the galvanomirror position signal GPOS from the position detector 24. Namely, the tracking error detector 26, a position servo circuit 28, an adder 44, a power amplifier 46, and the actuator coil 22 form a position servo loop for controlling the position of the read beam 12 by zeroing the tracking error signal TES1. The position detector 24, a position lock circuit 30, the adder 44, the power amplifier 46, and the actuator coil 22 form a position lock servo loop for locking the galvanomirror 20 at its neutral position where the galvanomirror position signal GPOS is zero. A processor (MPU) 32 serving as control means turns ON and OFF the position servo circuit 28 and position lock circuit 30 of the reed servo portion 48, thereby enabling and disabling the servo control to achieve one of modes 1 to 6 to be explained later.

The write beam control portion 50 for controlling the position of the write beam 14 involves a position servo loop comprising the tracking error detector 42, a position servo circuit 56, a power amplifier 58, and a tracking coil 78 of the lens actuator, to control the lens actuator to zero the tracking error signal TES2 obtained from the write beam 14. There is also arranged a position lock servo loop comprising the position detector 62, a position lock circuit 64, a power amplifier 66, and a VCM positioner 68 for driving the carriage 36 of the movable optical system. For example, when the lens actuator is moved from its neutral position according to the tracking error signal TES2 during the position control of the write beam 12, the position lock servo loop controls the VCM positioner 68 to return the lens actuator to the neutral position.

The erase beam control portion 52 includes a position servo loop relying on the tracking error signal TES3 of the erase beam. The position servo loop for the erase beam is equal to that of the write beam control portion 50 excluding the position lock servo loop.

Among the beam position control portions shown in FIG. 7, an object of the present invention is the read beam position control by the read beam control portion 48. Since an immediate read operation is carried out during a write operation, the invention includes simultaneous control of the read and write beams.

Figure 8:
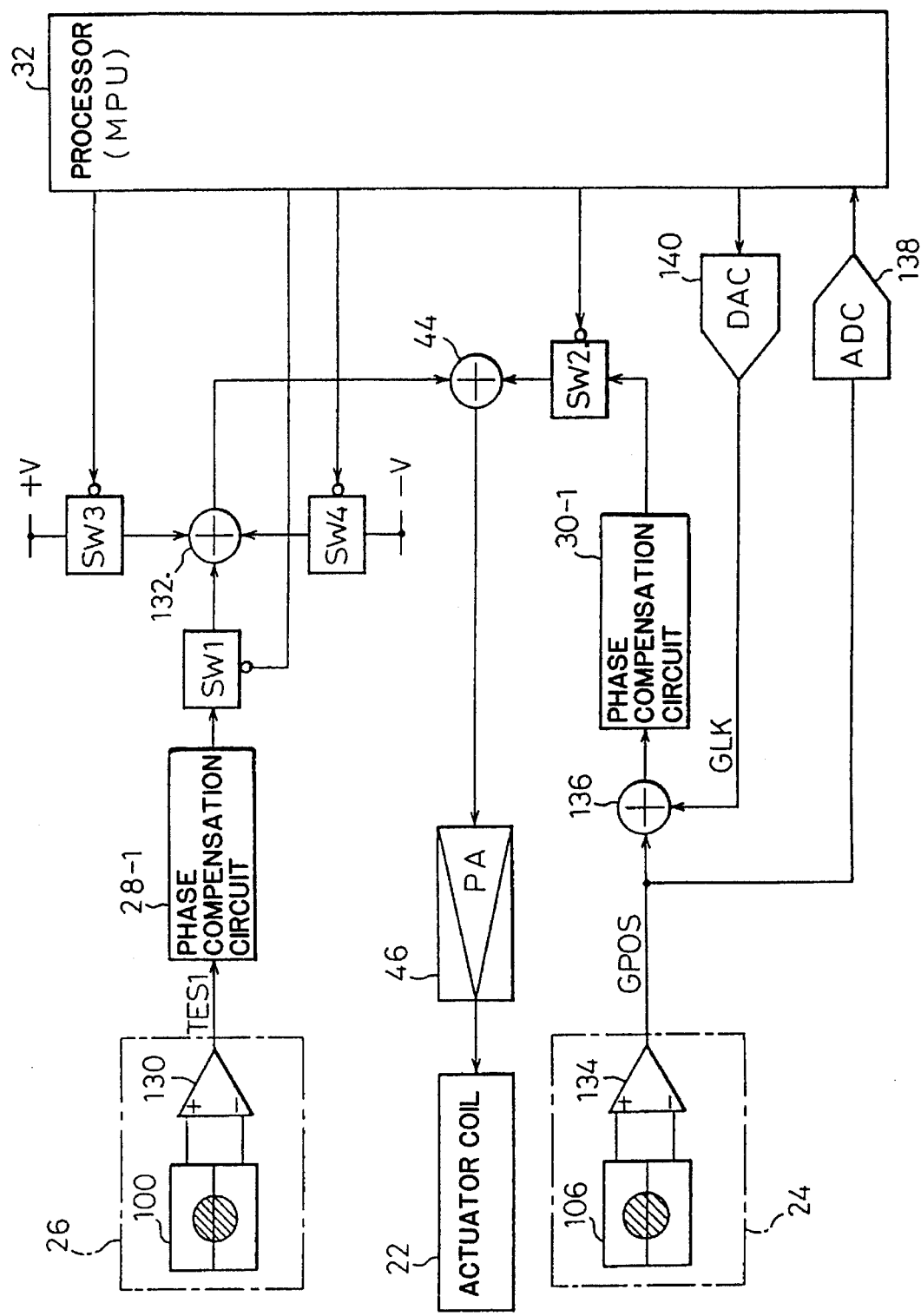
FIG. 8 is a schematic view showing a read servo portion according to an embodiment of the invention of FIG. 1B.

FIG. 8 shows an embodiment of the read beam control portion 48 shown in FIG. 7 according to the invention.

In FIG. 8, the position servo loop will be explained at first. The tracking error detector 22 has a two-piece photosensor 100 and a subtracter 130, which detect the tracking error signal TES1 from a return beam of the read beam 12 according to the push-pull method (far field method). According to the push-pull method, two light receiving portions of the two-piece photosensor 100 that are symmetrically disposed on each side of a track center detect a beam reflected and diffracted by a guide groove on the disk, and provide two outputs. The method provides a difference of the outputs as the tracking error signal TES1. The tracking error signal TES1 from the tracking error detector 22 is transferred to a phase compensation circuit 28-1 included in the position servo circuit 28 of FIG. 7. The phase compensation circuit 28-1 carries out phase advancing compensation to increase a high-band gain of a servo band of the signal. The position servo circuit 28 including the phase compensation circuit 28-1 corresponds to the position servo means of the principle view of FIG. 1B. An output of the phase compensation circuit 28-1 is supplied to a servo switch SW1, adders 132 and 44, and the actuator coil 22 through the power amplifier 46.

Next, the position lock servo loop will be explained. The position detector 24 comprises a two-piece photosensor 106 and a subtracter 134, to provide the galvanomirror position signal GPOS having characteristics of, for example, FIG. 6. The galvanomirror position signal GPOS from the position detector 24 is passed through an adder 136 and supplied to a phase compensation circuit 30-1 included in the position lock circuit 30 of FIG. 7 corresponding to the position lock means of the principle view of FIG. 1B. The circuit 30-1 carries out phase advancing compensation for a high band portion of a servo band of the signal. An output of the phase compensation circuit 30-1 is passed through a servo switch SW2, the adder 44, and the power amplifier 46, and supplied to the actuator coil 22 of the galvanomirror.

A gain zero cross frequency representing a servo band of the position servo loop for the tracking error signal TES1 is set to 3 to 5 KHz. On the other hand, a gain zero cross frequency representing a servo band of the position lock servo loop for the galvanomirror position signal GPOS is set to 300 to 1 KHz.

The adder 132 of the position servo loop disposed after the servo switch SW1 is used for controlling the position of the read beam according to open loop control with the servo switch SW1 being OFF. Namely, the adder 132 receives a forward seek control voltage +V through a servo switch SW3 and a reverse seek control voltage −V through a servo switch SW4.

On the other hand, the galvanomirror position signal GPOS from the position detector 24 of the position lock servo loop is converted into a digital signal by an AD converter 138, and fetched by the processor 32 serving as a control means. As will be explained later, the processor 32 turns OFF the servo switch SW2 to disable the position lock servo loop, and ON the servo switch SW1 to enable the position servo loop according to the tracking error signal TES1. The processor 32 fetches the galvanomirror position signal GPOS from the position detector 24, computes an offset quantity with which the GPOS signal is unchanged under a position lock state, sets the offset quantity in a DA converter 140, and adds, through the adder 136, an offset signal GLK from the DA converter 140 to the galvanomirror position signal GPOS.

The processor 32 serving as the control means turns ON and OFF the servo switches SW1 and SW2 according to a beam position control state, to enable one, or both, or none of the position servo operation and position lock operation, thereby controlling the read beam to an optimum position. The beam position control by the processor 32 takes one of modes 1 to 6 shown in FIGS. 9 through 14.

Figure 9:
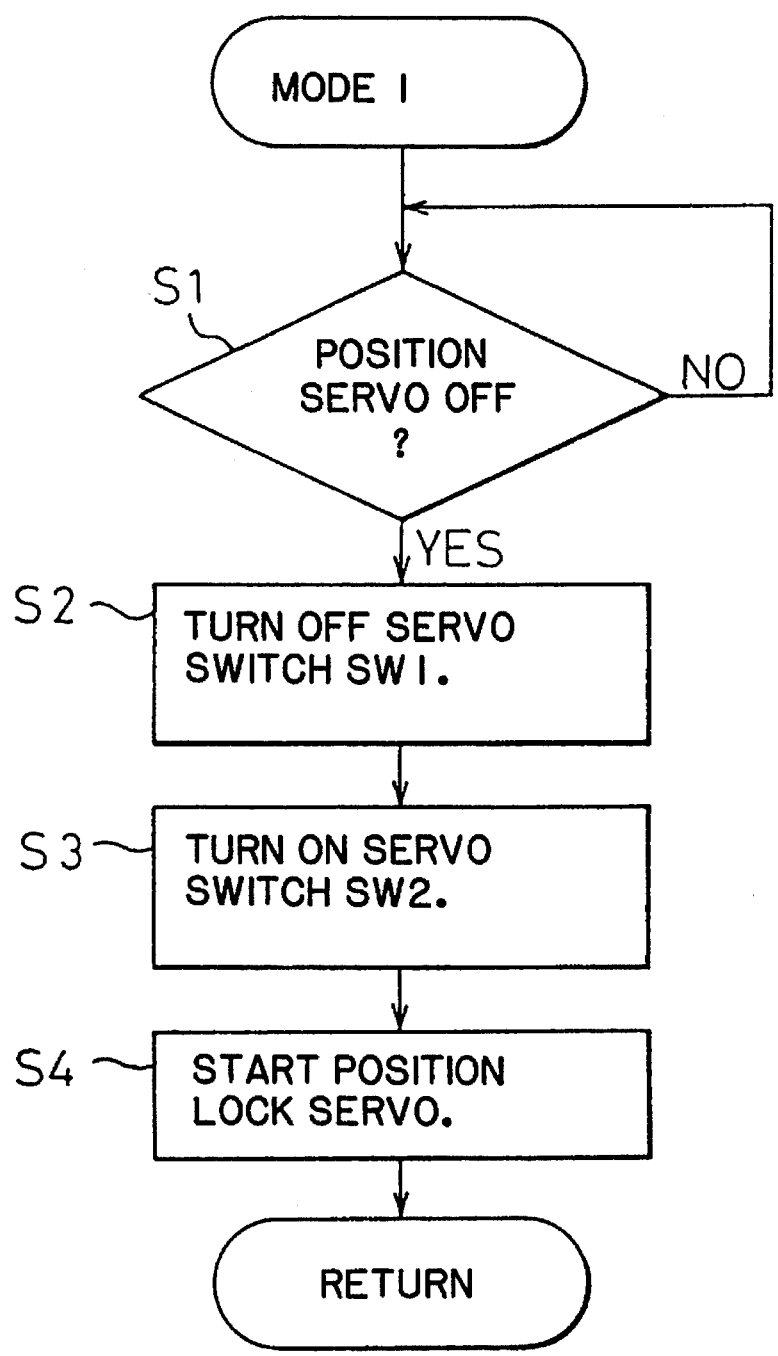
FIG. 9 is a flowchart showing a control operation of mode 1 according to the invention of FIG. 1B.

FIG. 9 is a flowchart showing the beam position control of mode 1 carried out by the processor 32 of FIG. 8.

According to the mode 1 of FIG. 9, Step S1 (hereinafter, the word "Step" will be omitted) monitors an OFF status of the position servo loop based on the tracking error signal TES1. When the OFF status of the position servo loop is established due to, for example, a track jump operation, S2 turns OFF the servo switch SW1 to disable the position servo loop, and S3 turns ON the servo switch SW2 so that the position lock servo operation is carried out in S4.

This switching from the position servo loop, which has been disabled, to the position lock servo loop locks the galvanomirror 20 at a given position irrespective of disturbing vibration, thereby stabilizing the read beam when the position lock servo is resumed.

Figure 10:
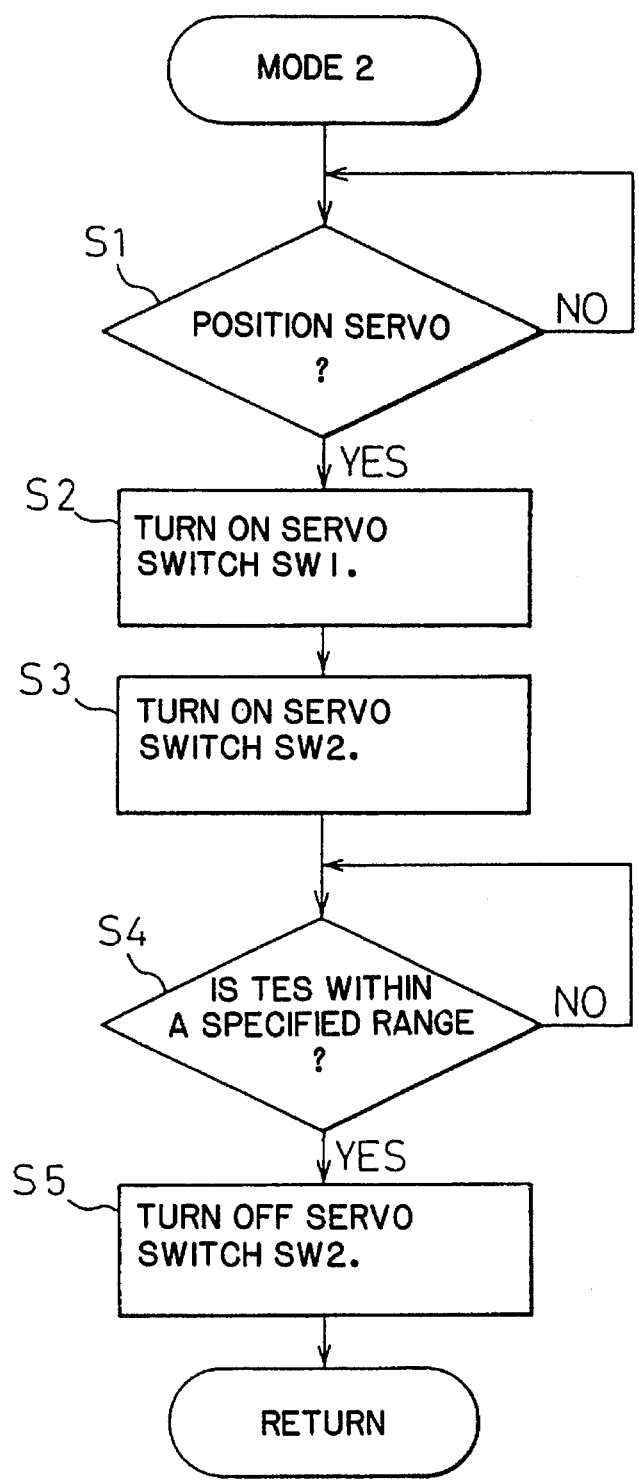
FIG. 10 is a flowchart showing a control operation of mode 2 according to the invention of FIG. 1B.

FIG. 10 is a flowchart showing a beam position control operation of mode 2 according to the invention. This mode 2 relates to track servo control for bringing the beam onto a target track after the completion of a track jump operation.

Namely, S1 checks to see whether or not the track jump is completed and the position servo loop is to be started. If it is determined that the position servo control is to be started, S2 turns ON the servo switch SW1 to enable the position servo loop. S3 turns ON the servo switch SW2 to simultaneously enable the position lock operation. After S2 and S3 start the position servo operation and position lock operation, S4 monitors whether or not the tracking error signal TES1 is stabilized to a specified value. When the tracking error signal TES1 is stabilized to the specified value to establish an on-track status, S5 turns OFF the servo switch SW2 to disable the position lock operation. Thereafter, the beam position is controlled only by the position servo operation.

The mode 2 of FIG. 10 carries out both the position servo operation according to the tracking error signal TES1 and the position lock operation according to the galvanomirror position signal GPOS while the beam is being unstable after a track jump, to quickly stabilize the beam to an on-track condition. Once the beam is stabilized, the position lock servo loop according to the galvanomirror position signal GPOS is disabled to prevent a conflict between the two servo loops from causing a servo remainder and an off-track.

Figure 11:
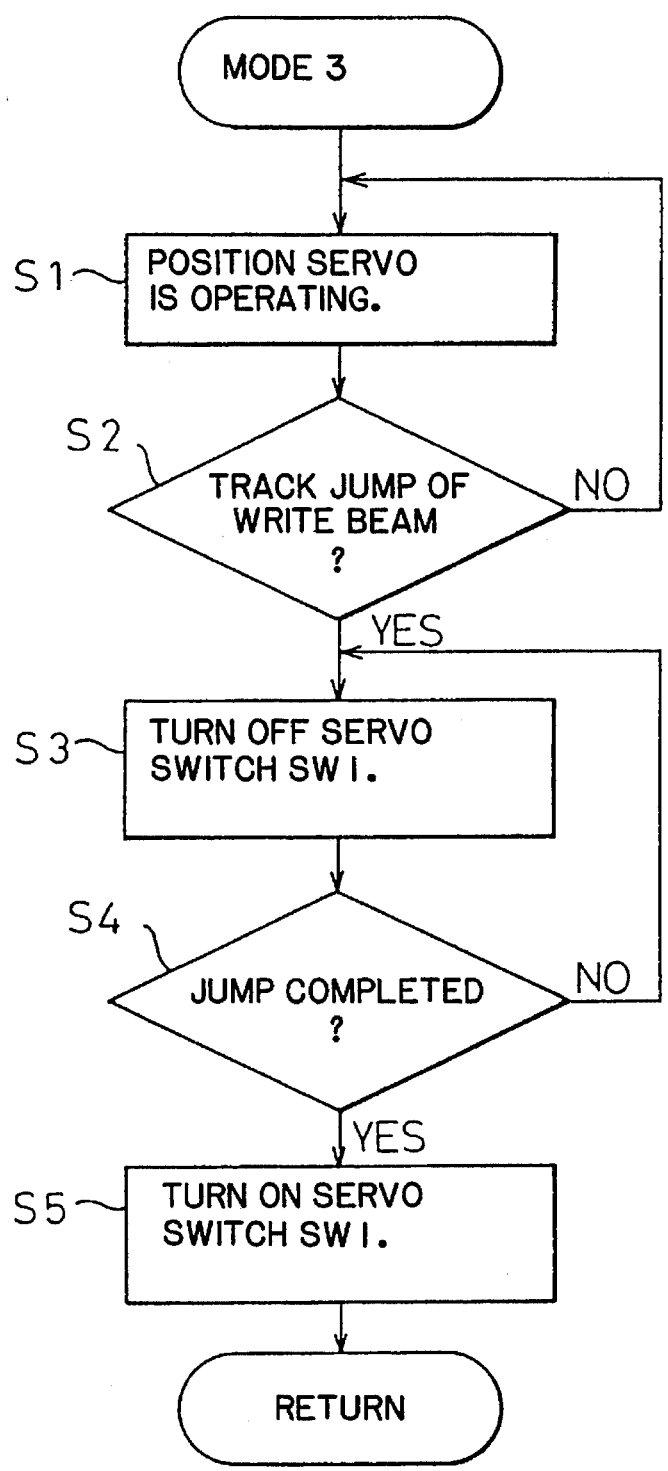
FIG. 11 is a flowchart showing a control operation of mode 3 according to the invention of FIG. 1B.

FIG. 11 is a flowchart showing the beam position control of mode 3 according to the invention. Under the mode 3, the position servo operation of the read beam is carried out according to the tracking error signal TES1, and at the same time, the write beam is jumped across tracks.

In FIG. 11, S1 carries out the position servo loop of the write beam according to the tracking error signal TES1. Under this state, S2 checks an instruction for jumping the write beam across tracks. When S2 finds the instruction for jumping the write beam across tracks, S3 turns OFF the servo switch SW1 to disable the position servo operation of the read beam. At this time, the servo switch SW2 is already OFF in S1, so that the servo switches SW1 and SW2 are both OFF during the track jump. Namely, the position servo operation and position lock operation are both disabled, and the galvanomirror 20 is uncontrolled.

S4 completes the track jump of the write beam, and S5 turns ON the servo switch SW1 to resume the position servo operation of the read beam.

The beam position control of mode 3 of FIG. 11 is effective when the position of the read beam, which is left uncontrolled during the jump, does not change its relative position to the write beam during the track jump of the write beam.

Figure 12:
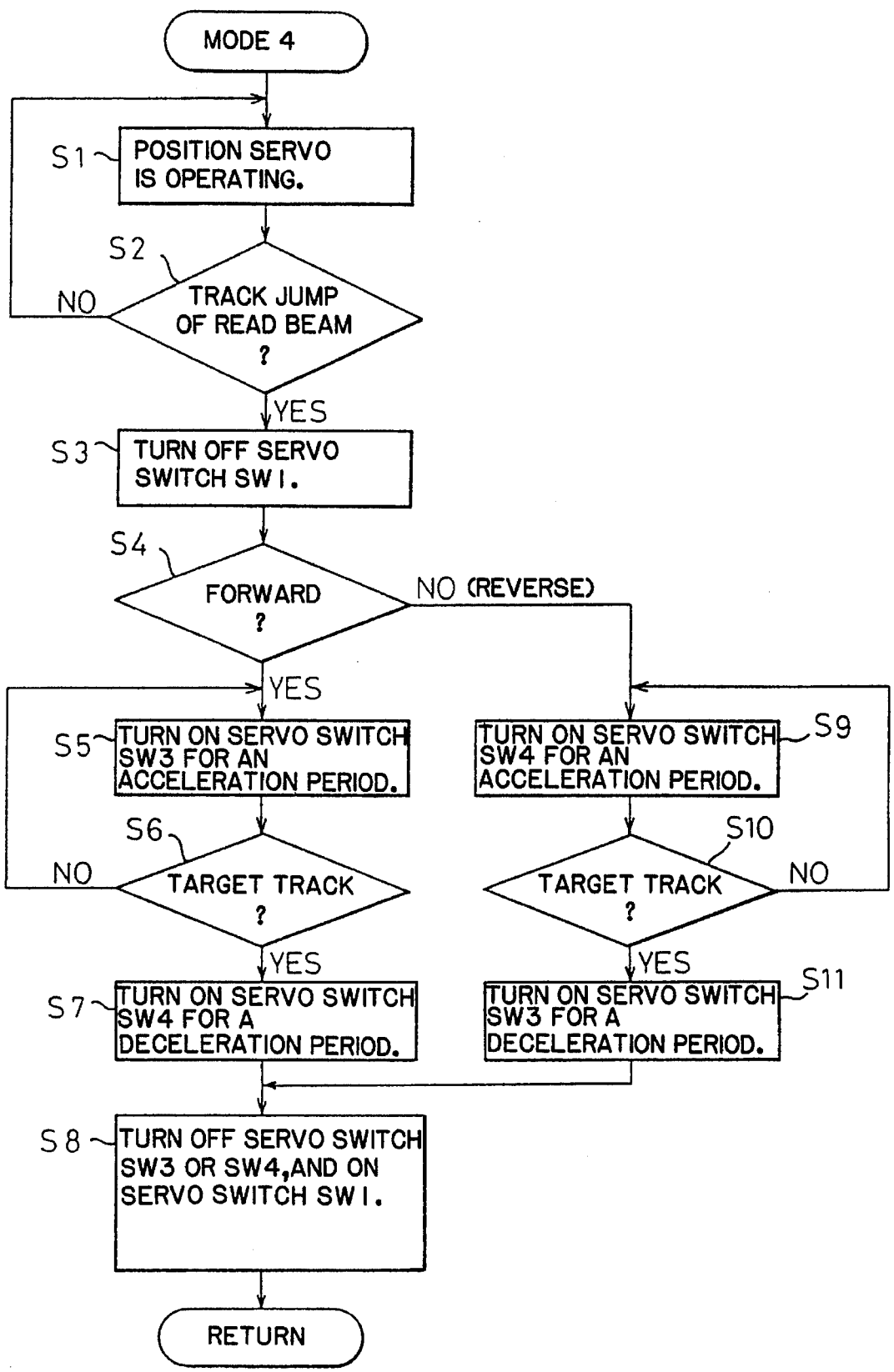
FIG. 12 is a flowchart showing a control operation of mode 4 according to the invention of FIG. 1B.

FIG. 12 is a flowchart showing the beam position control of mode 4 according to the invention. Under the mode 4, the position servo operation of the read beam is carried out, and at the same time, the read beam alone is jumped across tracks.

In FIG. 12, S1 enables the position servo operation of the read beam. S2 monitors whether or not the read beam is jumped across tracks. When S2 finds the track jump of the read beam, S3 turns OFF the servo switch SW1 to disable the position servo operation of the read beam according to the tracking error signal TES1. S4 determines whether the direction of the track jump is forward or reverse. If it is forward, S5 turns ON the servo switch SW3 only for an acceleration period, to accelerate the galvanomirror 20 in the forward direction by open control. S6 monitors whether or not the read beam has reached a target track. For example, S6 finds a track difference to the target track according to the number of crossed tracks obtained from zero crossings of the tracking error signal. When the track difference becomes zero, S6 determines that the beam has reached the target track, and S7 turns ON the servo switch SW4 only for a deceleration period. Thereafter, S8 turns ON the servo switch SW1 to start the position servo operation of the read beam according to the tracking error signal TES.

On the other hand, if S4 determines that the seek direction is reverse, S9 turns ON the servo switch SW4 only for an acceleration period, to drive the galvanomirror 20 with a control voltage -V according to open control. When S10 determines that the beam has reached a target track, S11 turns ON the servo switch SW3 only for a deceleration period. Thereafter, S8 turns ON the servo switch SW1 to resume the position servo operation of the read beam according to the tracking error signal TES1.

Figure 13:
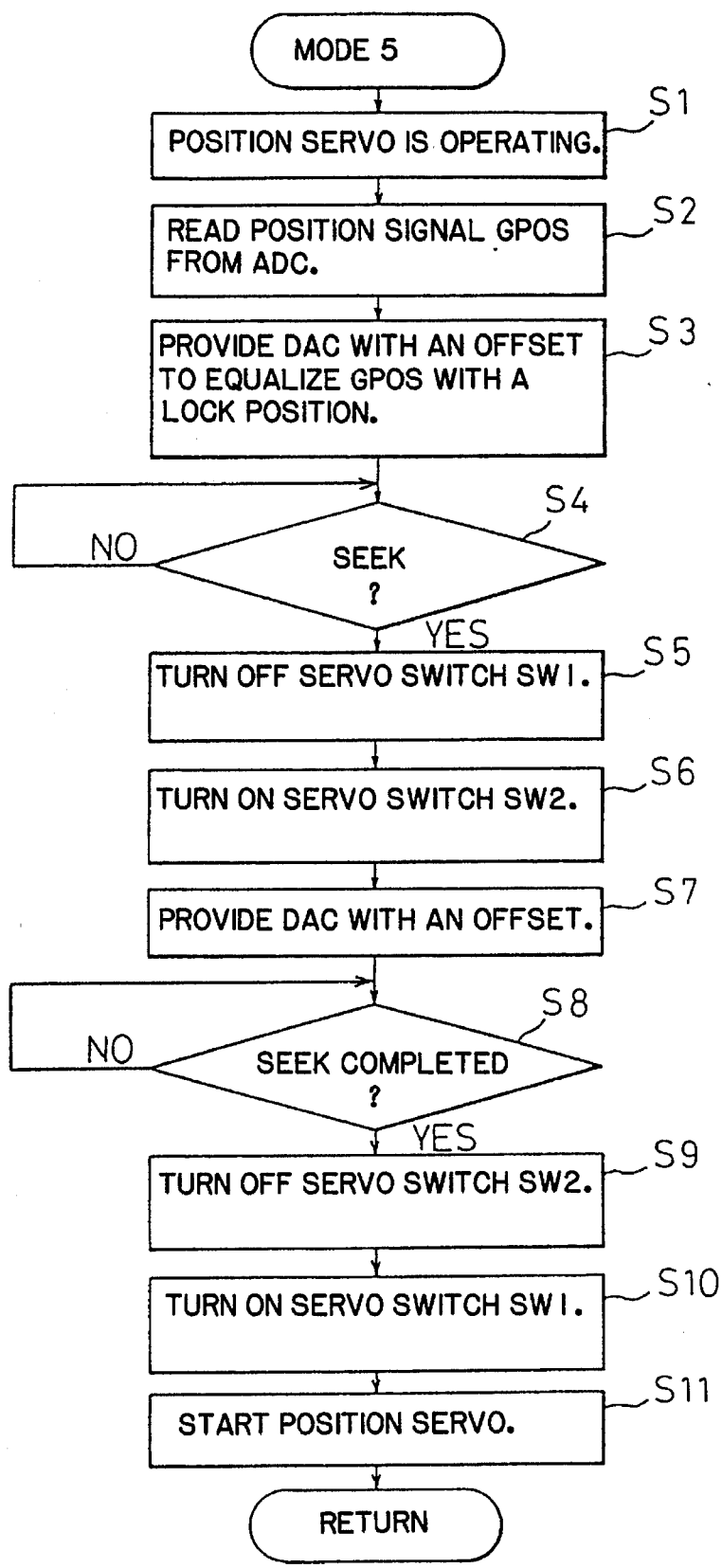
FIG. 13 is a flowchart showing a control operation of mode 5 according to the invention of FIG. 1B.
Figure 14:
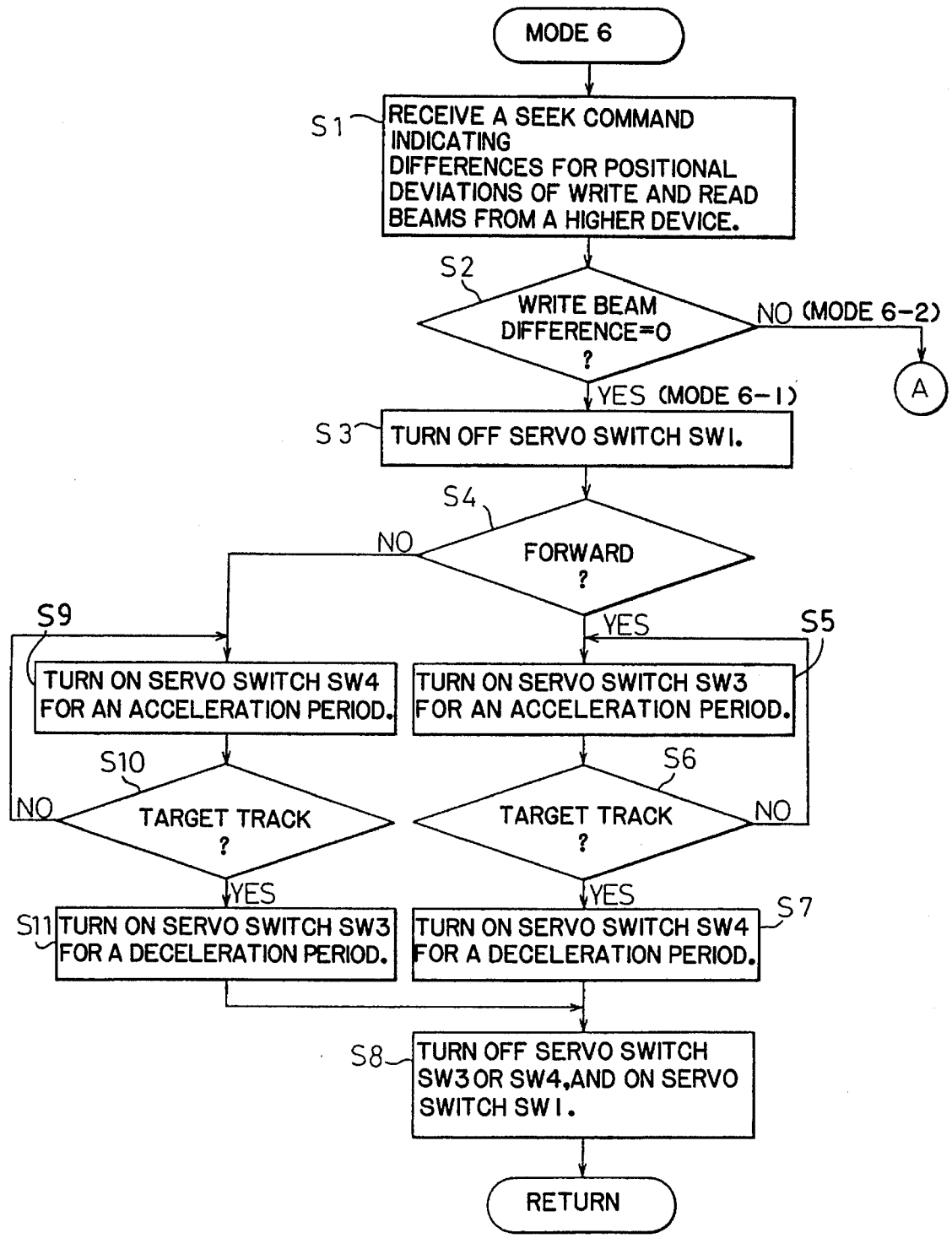
FIGS. 14A and 14B are flowcharts showing a control operation of mode 6 according to the invention of FIG. 1B.
Figure 14:
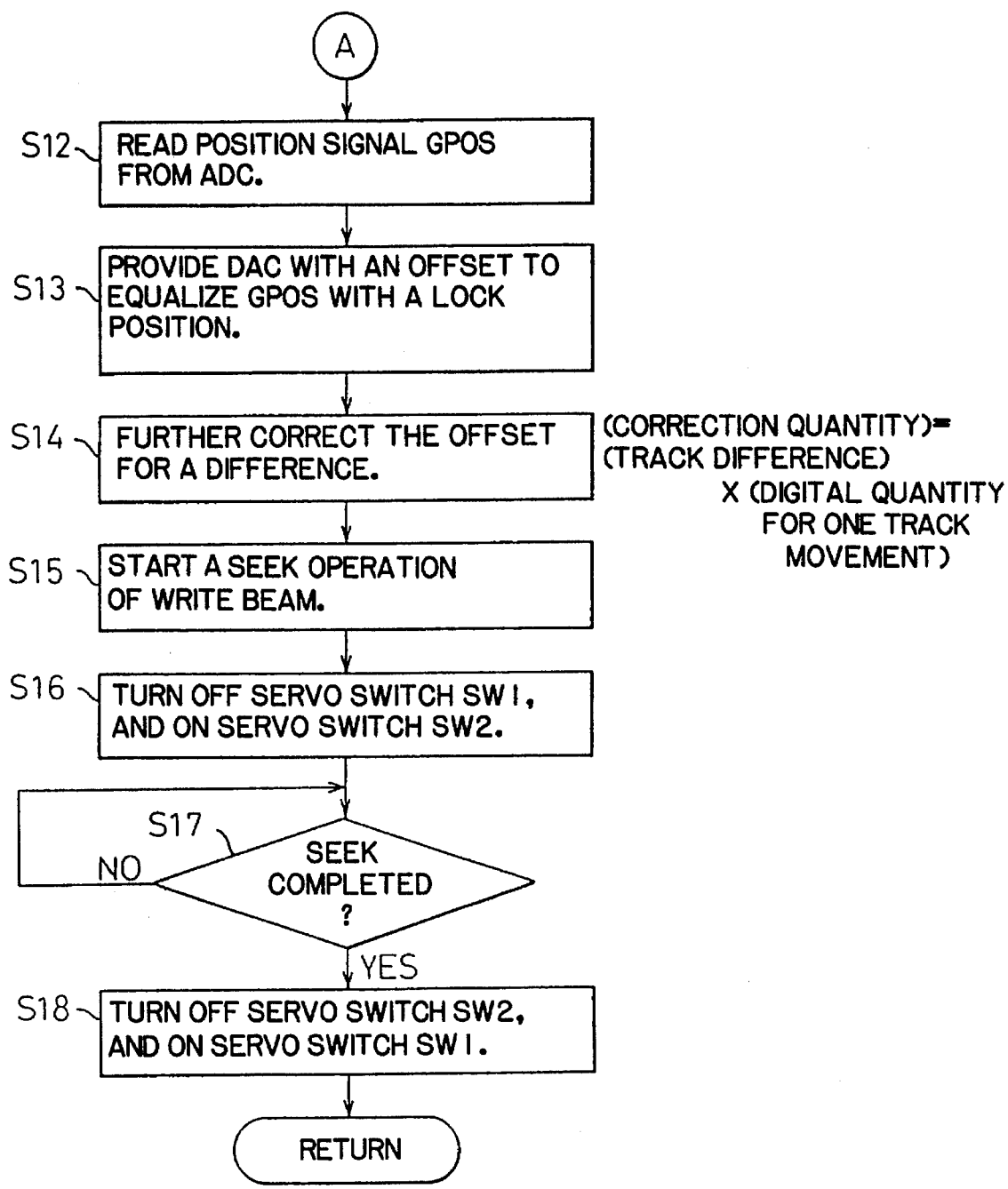

FIG. 13 is a flowchart showing the beam position control of mode 5 of the invention. The mode 5 carries out the position servo operation of the read beam according to the tracking error signal TES1, reads the galvanomirror position signal GPOS, adds an offset signal to the signal GPOS so that the galvanomirror position signal GPOS does not change when the position servo operation is switched to the position lock operation, shifts the galvanomirror from its neutral position in response to the offset signal at the time of a track jump, and sets the beam onto a target track according to the position servo operation after the completion of the track jump.

In FIG. 13, S1 carries out the position servo operation of the read beam according to the tracking error signal TES1 to put the beam on a track. S2 reads the galvanomirror position signal GPOS from the position detector 24 and sets the same in the AD converter 138. S3 sets offset data in the DA converter so that the position signal GPOS is at a lock position, and provides the adder 136 with an offset signal GLK.

S4 monitors a seek instruction for jumping the write beam across tracks. If the seek instruction is found, the servo switch SW1 is turned OFF to disable the position servo loop, and S6 turns ON the servo switch SW2 to enable the position lock operation according to the galvanomirror position signal GPOS. At this time, the offset data found in S1 to S3 is set in the DA converter 140, and the offset signal GLK is given to the adder 136 so that the position of the galvanomirror 20 is locked at an offset position indicated by the offset signal GLK.

S8 monitors the completion of the seek operation with the write beam. When the seek operation with the write beam is completed, S9 turns OFF the servo switch SW2, and S10 turns ON the servo switch SW1. Then, S11 resumes the position servo operation according to the tracking error signal TES1.

The beam position control of mode 5 forcibly locks the galvanomirror at the offset position according to the offset signal GLK, so that no position servo operation may be carried out during the track jump. After the write beam jumps across tracks and is set on a target track, the position servo operation of the read beam is resumed. As a result, the read beam may be correctly positioned onto a track with keeping the same relative positions between the read and write beams as at the start of the seek operation. Accuracy of positioning the read beam to a track with keeping the same relative positions between the read and write beams is about one fourth of a track.

FIGS. 14A and 14B are flowcharts showing the beam position control of mode 6 of the invention. The mode 6 is set when a higher controller provides a seek command involving differences because the track positions of the write and read beams deviate while an immediate read operation, etc., is being carried out during a write operation.

In FIGS. 14A and 14B, S1 receives the seek command involving differences from the higher controller for the write and read beams. S2 checks to see whether the difference for the write beam in the seek command from the higher controller is zero or not, i.e., whether or not a seek operation with the write beam is to be carried out. If the difference of the write beam is zero (mode 6-1), i.e., if there is no seek operation with the write beam but only a seek operation with the read beam, processes following S3 that are the same as those of the mode 4 of FIG. 12 are carried out.

On the other hand, if the difference for the write beam is not zero (mode 6-2) in S2, i.e., if both the write and read beams are moved with seek operations, processes following S12 are carried out.

Similar to S2 and S3 of the mode 5 of FIG. 13, S12 carries out the position servo operation of the read beam according to the tracking error signal TES1, and during the operation, reads the galvanomirror position signal GPOS from the AD converter 138. S13 provides offset data to the DA converter 140 so that the galvanomirror position signal GPOS is set for a lock position, and lets the adder 136 provide the offset signal GLK.

S14 further corrects the offset quantity for a difference between the moving distance of the write beam and that of the read beam instructed by the seek command. A correction quantity for the offset is equal to a value obtained by multiplying a difference between the track differences of the write and read beams by a digital quantity given to the DA converter 140 for moving the read beam for a track width (a galvanomirror sensitivity for moving a beam for a track).

S15 starts the seek operation with the write beam, and S16 turns OFF the servo switch SW1 to disable the position servo operation during the seek operation, and ON the servo switch SW2 to lock the galvanomirror at a position shifted by the offset quantity corrected in S14.

The read beam 12 and write beam 14 in the embodiments of the invention may be replaced with each other.

As explained above, the one aspect of the invention provides a beam position control system of an optical disk unit that carries out an accurate high-speed access operation and minimizes an off-track of a read beam after a track jump even with disturbing vibration.

Next, another aspect of the invention shown in FIG. 17 will be explained. Before the explanation, further problems of the conventional arrangement will be explained with reference to FIGS. 15 and 16. Tension of cables, etc., connected to the galvanomirror 20 causes a stop point of the position locked galvanomirror to deviate from a zero point of the galvanomirror position signal GPOS. Against this deviation between the stop point of the galvanomirror 20 and the zero point of the galvanomirror position signal, the position lock servo applies a force to zero the galvanomirror position signal GPOS to overcome the mechanical tension applied to the galvanomirror 20. This force is dependent on a servo gain. Accordingly, an adjusting tool is used in a manufacturing stage of the unit, to adjust the gain such that the write and read beams are positioned substantially on the same track with the position of the galvanomirror being locked.

It is difficult, however, to equalize the gains of the unit and adjusting tool with the position of the galvanomirror being locked. In addition, the temperature of the actuator coil of the galvanomirror and variations in outputs of a sensor light source of the galvanometer position detector may change the gains. Due to these factors, the stop point of the galvanomirror may shift when the position of the read beam is locked during a seek operation to be carried out with the write beam, and after the completion of the seek operation, the read beam may be positioned on a different track from a track on which the write beam is positioned. This raises a need of corrective seek operation for the read beam to extend an access time.

To solve the above-mentioned problem, an object of this aspect of the invention is to remove a mechanical offset of a galvanomirror, to make a read beam correctly follow a seek operation carried out with a write beam, thereby shortening an access time of the two beams.

Figure 17:
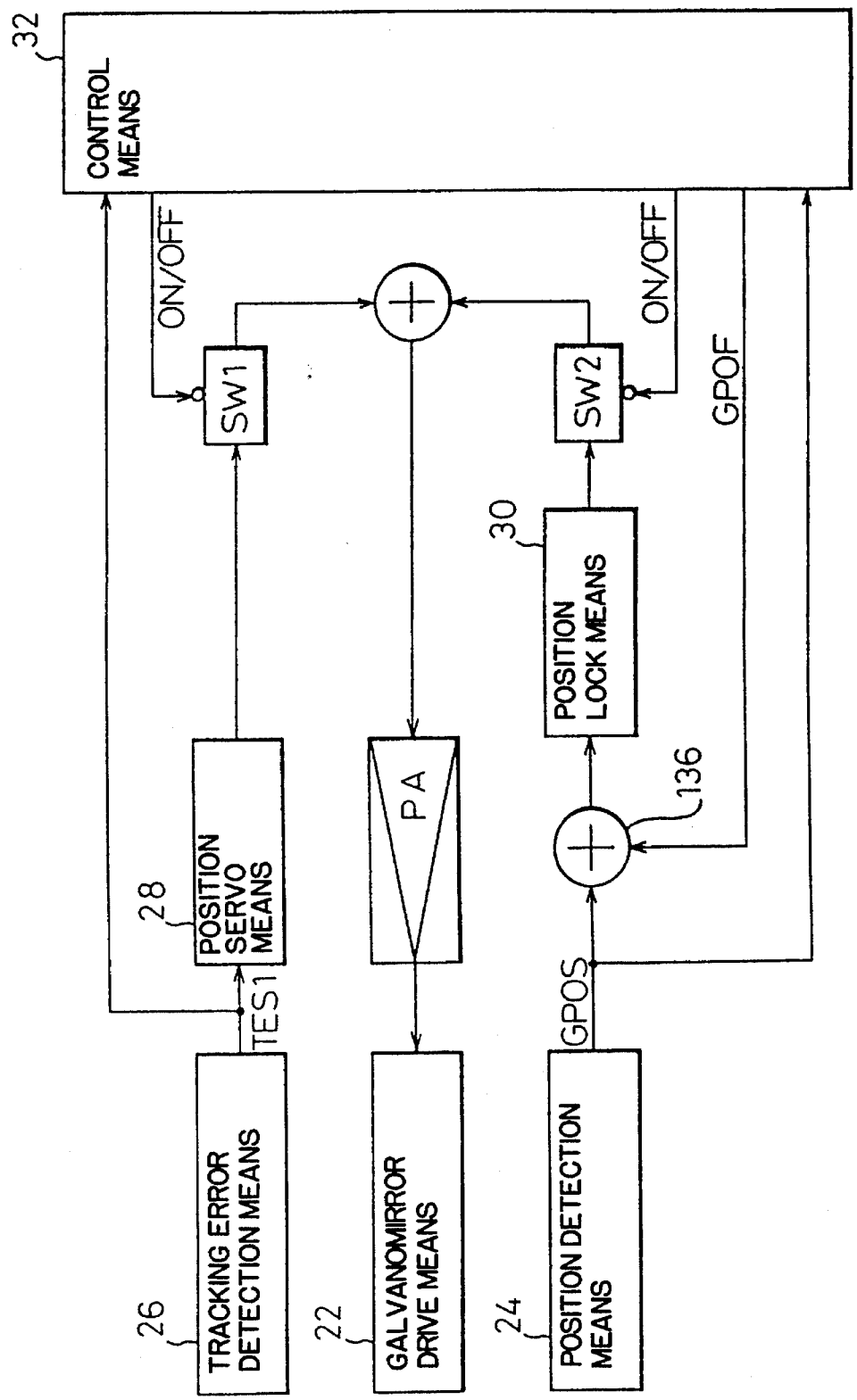
FIG. 17, is an explanatory view showing a principle of another aspect of the invention.

FIG. 17 is an explanatory view showing a principle of this aspect of the invention. As explained before, a first servo switch SW1 is turned ON for the tracking control of a read beam 12, to enable position servo means 28. A second servo switch SW2 is turned ON when the tracking control of the read beam 12 is disabled, to enable position lock means 30. Offset addition means 136 for adding an offset signal GPOF to a galvanomirror position signal provided by position detection means 24. Control means 32 turns ON the servo switch SW2 to enable the position lock control of the galvanomirror when the unit is energized or retried, reads a galvanomirror position signal GPOS, finds the offset signal GPOF for zeroing the galvanomirror position signal GPOS, and provides the offset signal to the offset addition means 136 during a seek operation to be carried out with a write beam 14.

The beam control system according to the invention for an optical disk unit locks the position of the galvanomirror when the unit is started or retried after an access error, obtains the galvanomirror position signal GPOS at this time, finds the offset signal GPOF for zeroing the position signal, and adds the offset signal GPOF to the position lock control of the read beam during a seek operation with the write beam. Even if a servo gain in the position lock control deviates from an adjusted gain set during manufacturing, the galvanomirror position lock control can maintain an adjusted state that positions the read beam on the same track as the write beam. This eliminates a correction seek operation of the read beam after the completion of the seek operation with the write beam, thereby shortening an access time of the two-beam method.

Figure 18:
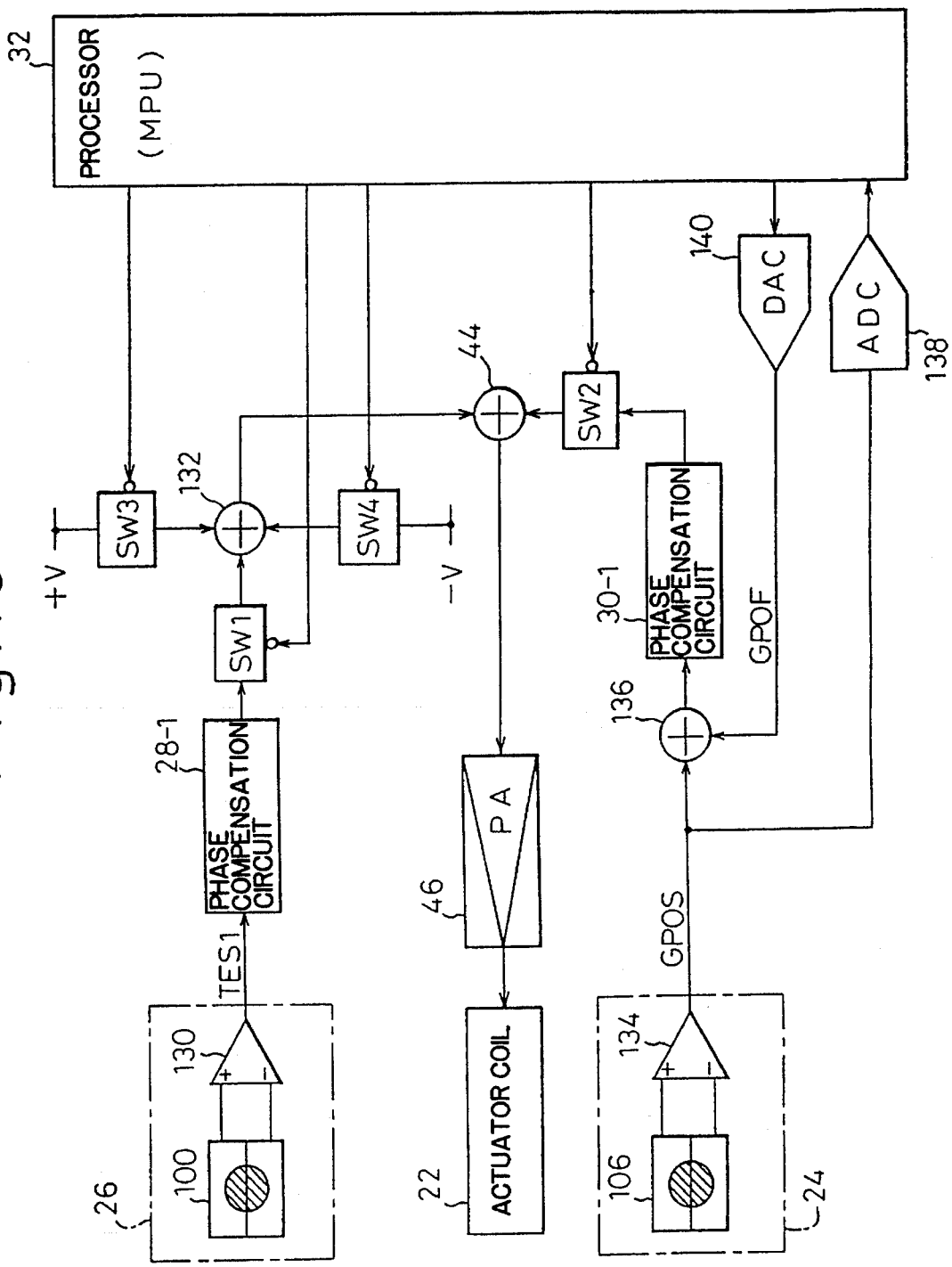
FIG. 18 is a schematic view showing a read servo control portion according to an embodiment of the invention of FIG. 17.

FIG. 18 shows a read servo portion according to an embodiment of the invention of FIG. 17. In FIG. 18, a position servo loop for carrying out the tracking control, i.e., the position servo control of a read beam comprises a tracking error detector 26, a phase compensation circuit (PC circuit) 28-1 included in a position servo circuit 28, a servo switch SW1, an adder 44, a power amplifier 46, and an actuator coil 22.

The servo switch SW1 disposed after the phase compensation circuit 28-1 is turned ON by a processor 32 when the tracking control of the read beam is carried out, and turned OFF when a seek operation with the write beam is carried out by a lens actuator.

A position lock servo loop for locking the galvanomirror 20 at its neutral position comprises a position detector 24, an adder 136, a phase compensation circuit 30-1 included in a position lock circuit 30 of FIG. 7, a servo switch SW2, the adder 44, the power amplifier 46, and the actuator coil 22. The galvanomirror position detector 24 has a two-piece photosensor 106 and a subtracter 134, to provide a galvanomirror position signal GPOS having characteristics shown in FIG. 6. An AD converter 138 fetches the galvanomirror position signal GPOS, which is used to form an offset signal GPOF for zeroing the galvanomirror position signal GPOS. The offset signal GPOF is supplied to the offset adder 136 through a DA converter 140. The adder 136 adds the offset signal GPOF to the galvanomirror position signal GPOS. The phase compensation circuit 30-1 carries out phase advancing compensation for increasing a gain of a high band portion of a servo band of the signal. The servo switch SW2 is turned ON when a seek operation with the write beam is started, and OFF when the seek operation with the write beam is completed. Namely, during the seek operation with the write beam, the servo switch SW2 is turned ON to enable the galvanomirror position lock loop.

A galvanomirror offset adjusting process carried out by the processor (MPU) 32 of FIG. 18 according to the invention will be explained with reference to a flowchart of FIG. 19.

Figure 19:
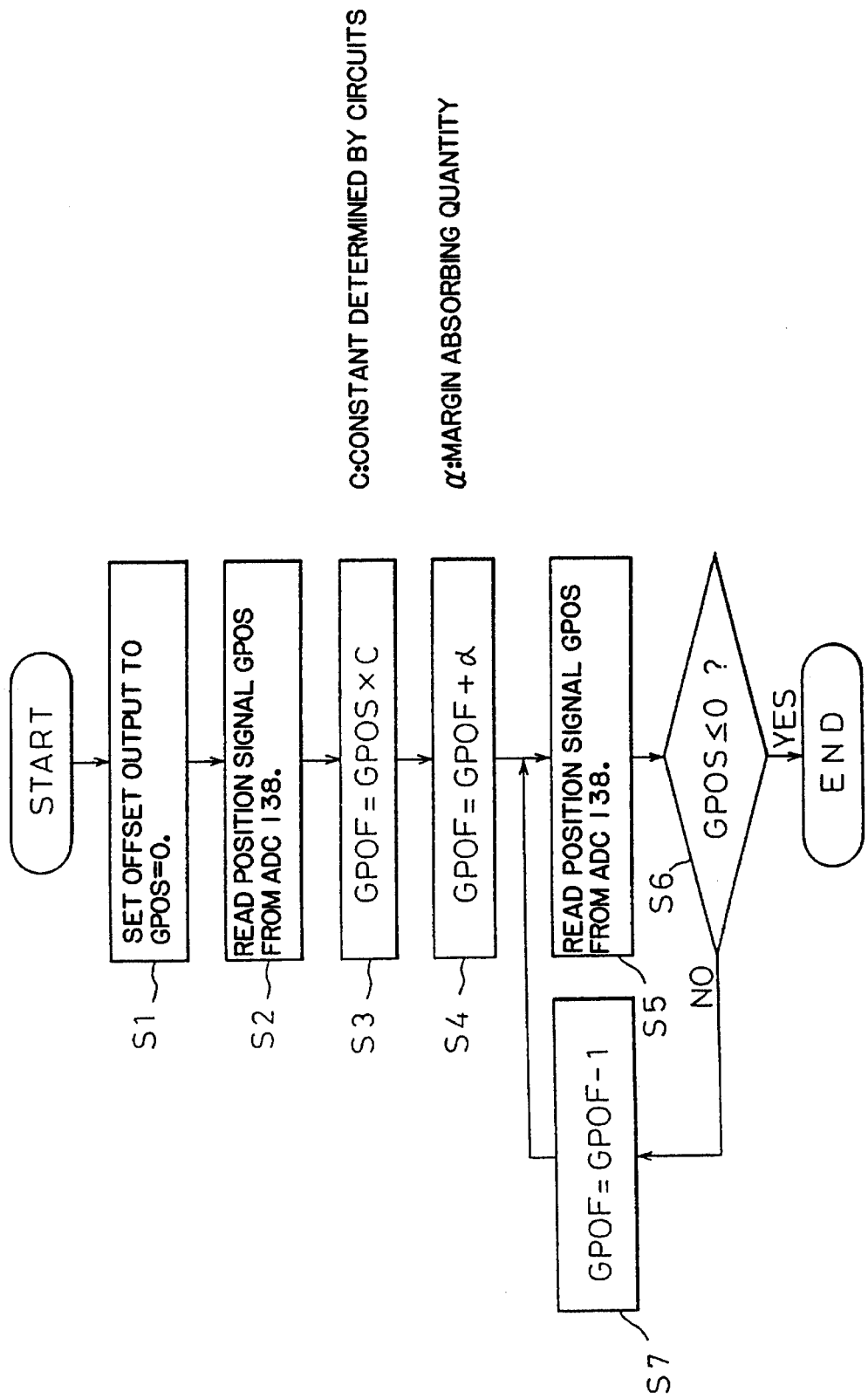
FIG. 19 is a flowchart showing a galvanomirror offset adjusting process according to the invention of FIG. 17.

The galvanomirror offset adjusting process of FIG. 19 is carried out when the optical disk unit is activated or before a retry operation due to an access error.

Firstly, Step S1 (the word "Step" will be omitted hereinafter) is an initialization step for resetting offset data to the DA converter 140 and zero the offset signal GPOF to the offset adder 136. Under this galvanomirror offset adjusting state, the servo switch SW1 is turned OFF, and the servo switch SW2 ON, so that only the galvanomirror position lock loop is active.

S2 converts the galvanomirror position signal GPOS presently provided by the galvanomirror position detector 24 into digital data through the AD converter 138. S3 multiplies the read galvanomirror position signal GPOS by a constant C determined by circuits, i.e., resolutions of the AD converter 138 and DA converter 140, to provide the offset signal GPOF. S4 adds a value α for absorbing a margin to the offset signal GPOF, and provides the result to the offset adder 136 through the DA converter 140. According to the offset signal GPOF, the galvanomirror position lock loop drives the galvanomirror 20 to remove the offset, i.e., to zero the galvanomirror position signal GPOS.

Under the offset adjusted state, S5 reads the galvanomirror position signal GPOS through the AD converter 138. S6 checks whether or not the galvanomirror position signal GPOS is below zero. If the offset signal GPOF provided in S4 is proper, the galvanomirror position signal GPOS at this time is zero or slightly below zero. Then, the galvanomirror offset adjusting process is terminated. If the galvanomirror position signal GPOS is larger than zero, S7 decreases the galvanomirror offset signal GPOF by one, S5 again reads the galvanomirror position signal GPOS, and S6 checks to see whether or not the signal is below zero. S7, S5, and S6 are repeated until the galvanomirror position signal becomes lower than zero.

In this way, the galvanomirror position locking servo loop of FIG. 19 operates to lock the position of the galvanomirror such that the galvanomirror position signal GPOS provided by the position detector 24 is zeroed.

Accordingly, during a seek operation with the write beam, the galvanomirror for the read beam is always locked, by adding an offset, at a position where the galvanomirror position signal GPOS is zero. When the position of the galvanomirror is locked, the write beam and read beam are positioned on the same track, so that, when the seek operation with the write beam is completed, i.e., when the write beam is moved by the lens actuator to a target track, the read beam is always on the same track as the write beam. This prevents the read beam from deviating from the write beam due to the operation of the galvanomirror position lock loop, and positions the write and read beams on the target track with a single access operation.

Figure 20:
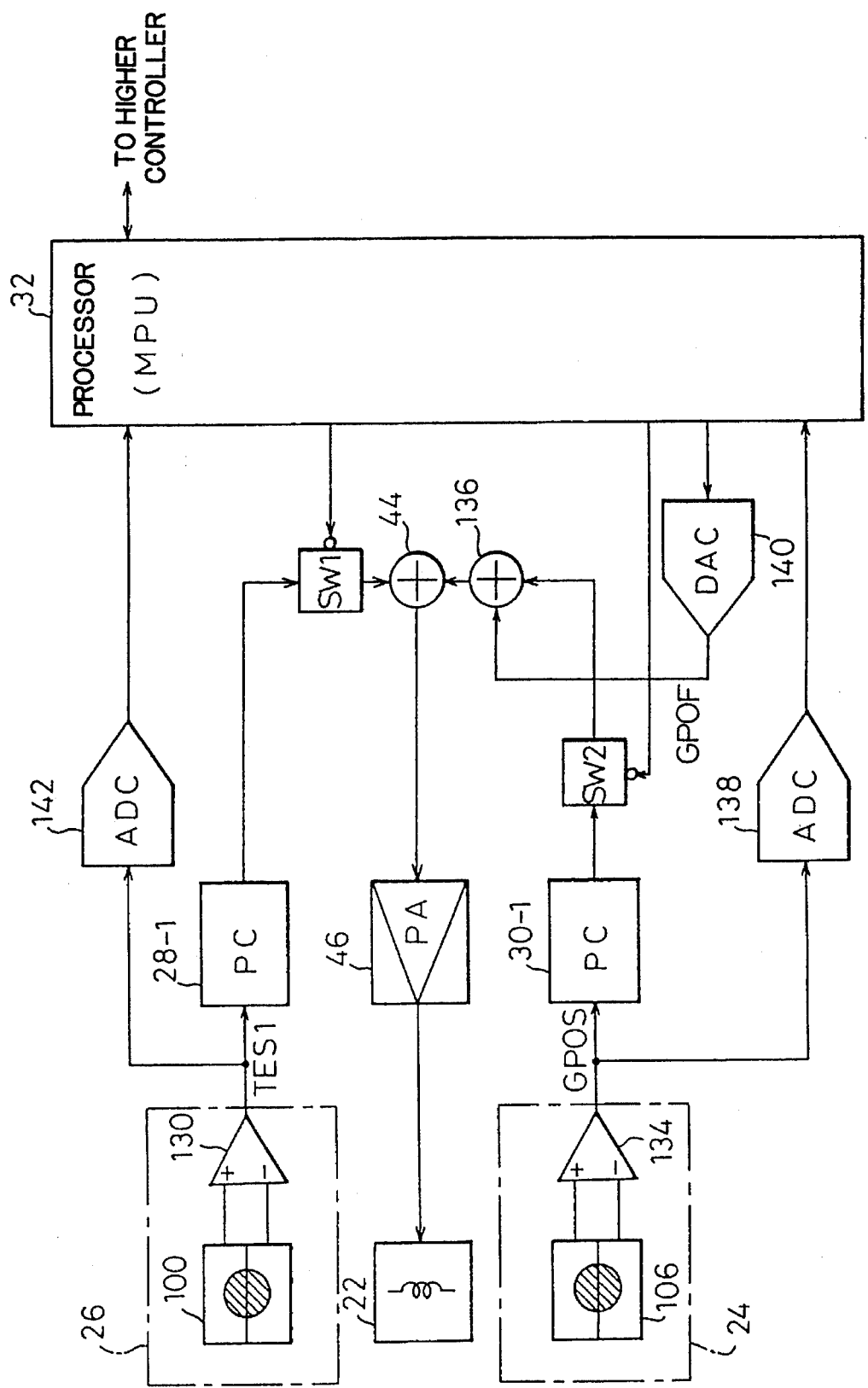
FIG. 20 is a schematic view showing another embodiment of the invention of FIG. 17.

FIG. 20 is a schematic view showing another embodiment of the invention of FIG. 17. According to this embodiment, the adder 136 of the galvanomirror position lock loop is disposed on an output side of the servo switch SW2. Other arrangements of this embodiment are the same as those of the embodiment of FIG. 18.

When the offset adder 136 is disposed on the output side of the servo switch SW2 as shown in FIG. 20, an offset is added to the galvanomirror position signal GPOS in a similar manner to the galvanomirror offset adjusting process of FIG. 19. In addition, it is possible to carry out relative position control for positioning the read beam at a position shifted by a predetermined number of tracks from the write beam. Namely, an offset quantity for moving the write beam for one track width is obtained in advance, and when a higher controller provides an instruction to access different tracks with the write and read beams, respectively, a track difference between the target tracks of the write and read beams is multiplied by a unit digital quantity for moving the read beam for one track width, to provide an offset signal. The offset signal is supplied to the offset adder 136 through the DA converter 140. Then, according to the seek operation with the write beam, the read beam is moved to its target track that is separated away from the write beam's target track by the predetermined relative quantity. This is applicable for the case of seeking a track only with the read beam without moving the write beam. In this case, the number of tracks crossed by the read beam is detected by the processor 32 according to the number of zero crossings of the tracking error signal TES1 of the read beam received through an AD converter 142.

The medium employed by the above embodiments is the magneto-optic disk. This invention is also applicable for an optical disk that records data by forming physical pits.

As explained above, this aspect of the invention positions a read beam on the same track as a write beam in accordance with a seek operation with the write beam, even if a galvanomirror has a mechanical offset. The invention eliminates a deviation of the read beam due to a galvanomirror position lock loop during the seek operation, abolishes a corrective seek operation for the read beam after the completion of the seek operation, and shortens an access time of the two-beam system.

Still another aspect of the invention shown in FIG. 21 will be explained. Before the explanation, the problems of the read beam position control system will be further explained with reference to FIGS. 15 and 16. As shown in the figures, this conventional arrangement disables the position lock loop and carries out the position servo control to trace a track with the read beam according to the tracking error signal TES1. If the position servo system malfunctions at this moment, the galvanomirror 20 may be greatly deflected. If the galvanomirror 20 is greatly deflected, the amplitude of the tracking error signal TES1, which is formed from a beam reflected by the galvanomirror 20, is zeroed, so that it will be impossible to distinguish the malfunction from a normal tracking state.

To solve the problem, an object of this aspect of the invention is to detect an abnormal deflection of the galvanomirror due to a malfunction of the tracking control servo system for the read beam and properly deals with the abnormality.

Figure 21:
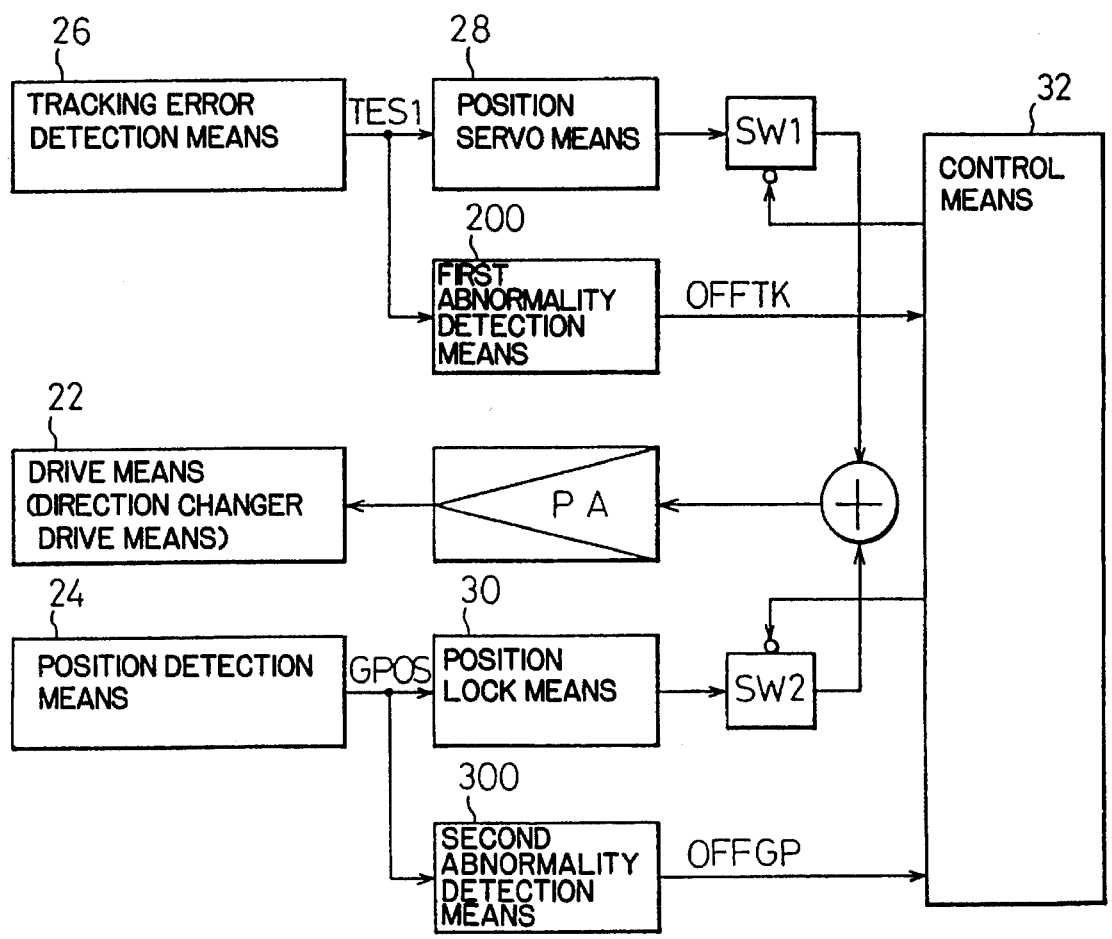
FIG. 21 is an explanatory view showing a principle of still another aspect of the invention.

FIG. 21 is an explanatory view showing a principle of this aspect of the invention. This aspect is characterized by first abnormality detection means 200 for detecting an abnormality in the tracking error signal TES1 and notifying control means 32 of the abnormality, and second abnormality detection means 300 for detecting an abnormality in the position signal GPOS and notifying the control means 32 of the abnormality.

When receiving the abnormality notices from the first and second abnormality detection means 200 and 300, the control means 32 turns OFF a first servo switch SW1 to disable the tracking control of a read beam 12, and ON the second servo switch SW2 thereafter, to carry out position lock control for forcibly returning a galvanomirror 20 to a predetermined position.

The first and second abnormality detection means 200 and 300 have window comparators for providing abnormality detected outputs when signal amplitudes exceed positive and negative threshold levels.

The beam control system for the optical disk unit according to this aspect of the invention having the above arrangement carries out tracking control with the read beam by driving the galvanomirror through position servo control according to the tracking error signal. At this time, if the position servo system malfunctions to abnormally deflect the galvanomirror, the galvanomirror position signal GPOS increases to a limit value, so that the abnormality becomes detectable. At the same time, the tracking error signal greatly falls due to the abnormal deflection of the galvanomirror, so that this abnormality also becomes detectable. Then, according to the abnormalities in both the signals, it is recognized that the galvanomirror is abnormally deflected due to the malfunction of the position servo.

After recognizing the abnormal deflection of the galvanomirror, the tracking control by the position servo system is disabled, and the position lock control by the position lock loop is enabled to forcibly return the galvanomirror to its neutral position, thereby recovering from the abnormality.

Figure 22:
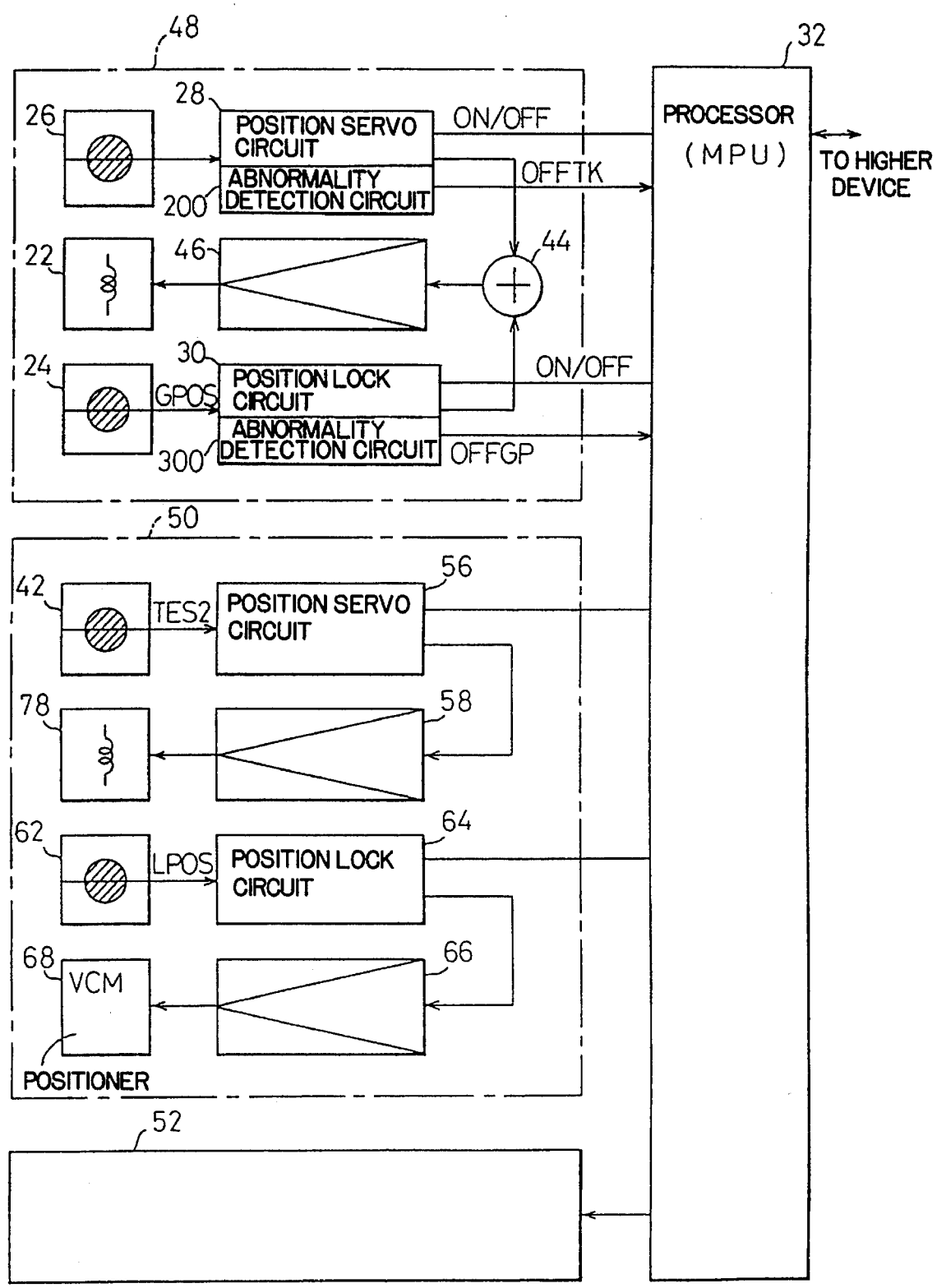
FIG. 22 is a general schematic view showing beam position control according to the invention of FIG. 21.

FIG. 22 is a general schematic view showing beam position control of the invention of FIG. 21. Among beam position control portions shown in the figure, an object of this invention is read beam position control by a read beam control portion 48. Since an immediate read operation is carried out during a write operation, the invention includes simultaneous control of a read beam 12 and a write beam 14.

Figure 23:
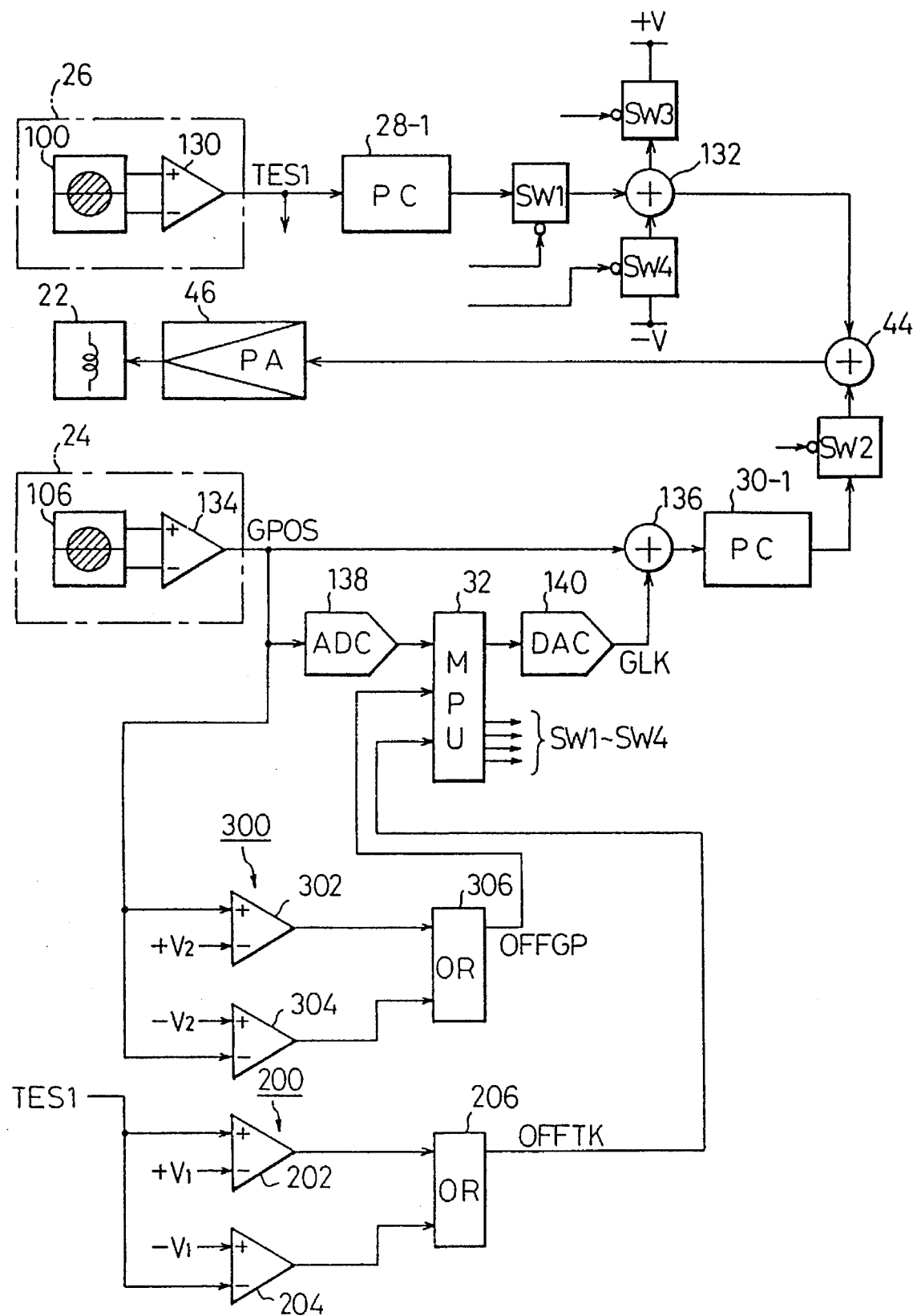
FIG. 23 is a schematic view showing an embodiment of the invention of FIG. 21.

FIG. 23 is a schematic view showing an embodiment of the read beam control portion according to the invention of FIG. 22.

In FIG. 23, a position servo loop for carrying out the tracking control of the read beam comprises a tracking error detector 26, a phase compensation circuit (PC circuit) 28-1 included in a position servo circuit 28 of FIG. 22, a servo switch SW1, an adder 132, an adder 44, a power amplifier 46, and an actuator coil 22 of a galvanomirror. The tracking error detector 26 has a two-piece photosensor 100 and a subtracter 130, which detect a tracking error signal TES1 from a return beam of the write beam according to the push-pull method (far field method). In the push-pull method, two light receiving portions of the two-piece photosensor 100 that are symmetrically disposed on each side of a track center detect a beam reflected and diffracted by a guide groove on a disk, and provide two outputs. The method provides a difference of the outputs as the tracking error signal TES1. The phase compensation circuit 28-1 is included in the position servo circuit 28 corresponding to the position servo means 28 of FIG. 21. The circuit 28-1 carries out phase advancing compensation to increase a high-band gain of a servo band of the tracking error signal TES1. The servo switch SW1 is turned ON by a control processor 32 when the tracking control is carried out, and OFF when the tracking control is disabled to carry out, for example, a track jump operation.

The adder 132 disposed after the servo switch SW1 is used when the write beam is jumped across tracks according to open loop control with the position servo loop being OFF. Namely, the adder 132 receives a forward seek control voltage +V through a servo switch SW3 and a reverse seek control voltage −V through a servo switch SW4. More precisely, the adder is used for Jumping only the read beam across tracks without moving the write beam.

A position lock loop for locking the galvanomirror 20 at a neutral position comprises the position detector 24, an adder 136, a phase compensation circuit 30-1 included in a position lock circuit 30 of FIG. 22, a servo switch SW2, the adder 44, the power amplifier 46, and the actuator coil 22. The galvanomirror position detector 24 has a two-piece photosensor 106 and a subtracter 134, to provide a galvanomirror position signal GPOS having characteristics shown in FIG. 6. The phase compensation circuit 30-1 carries out phase advancing compensation for increasing a gain of a high band portion of a servo band of the signal. The servo switch SW2 is turned ON and OFF by the processor 32. When the position servo loop according to the tracking error signal TES1 is OFF, the servo switch SW2 is turned ON to activate the position lock loop for maintaining the galvanomirror 20 at the neutral position. Namely, during a track jump operation, the servo switch SW2 is turned ON to enable the position lock loop.

The galvanomirror position signal GPOS from the position detector 24 is provided to an AD converter 138, so that the processor 32 can receive the galvanomirror position signal GPOS. The processor 32 provides offset data to a DA converter 140, so that an offset signal GLK is added to the galvanomirror position signal GPOS through the adder 136. Namely, while the position servo loop is carrying out tracking control of the read beam according to the tracking error signal, the processor 32 fetches the presently obtained galvanomirror position signal GPOS from the AD converter 138, and provides offset data for zeroing the galvanomirror position signal GPOS to the DA converter 140, so that the adder 136 adds the offset signal GLK to the galvanomirror position signal GPOS. This conversion of the galvanomirror position signal GPOS by adding the offset signal thereto makes a zero point of the tracking error signal TES1 agree with that of the galvanomirror position signal GPOS.

Further, the invention provides the first abnormality detection circuit 200 for detecting an abnormality in the tracking error signal TES1, and the second abnormality detection circuit 300 for detecting an abnormality in the galvanomirror position signal GPOS.

The first abnormality detection circuit 200 has a window comparator comprising a comparator 202 set with a threshold voltage of +V1 and a comparator 204 set with a threshold voltage of −V1. Outputs of the comparators 202 and 204 are collected by an OR gate 206 to provide an abnormality detected signal OFFTK.

Similarly, the second abnormality detection circuit 300 has a window comparator comprising a comparator 302 set with a threshold voltage of +V2 and a comparator 304 set with a threshold voltage of −V2. Outputs of the comparators 302 and 304 are collected by an OR gate 306 to provide the processor 32 with an abnormality detected signal OFFGP.

Figure 24:
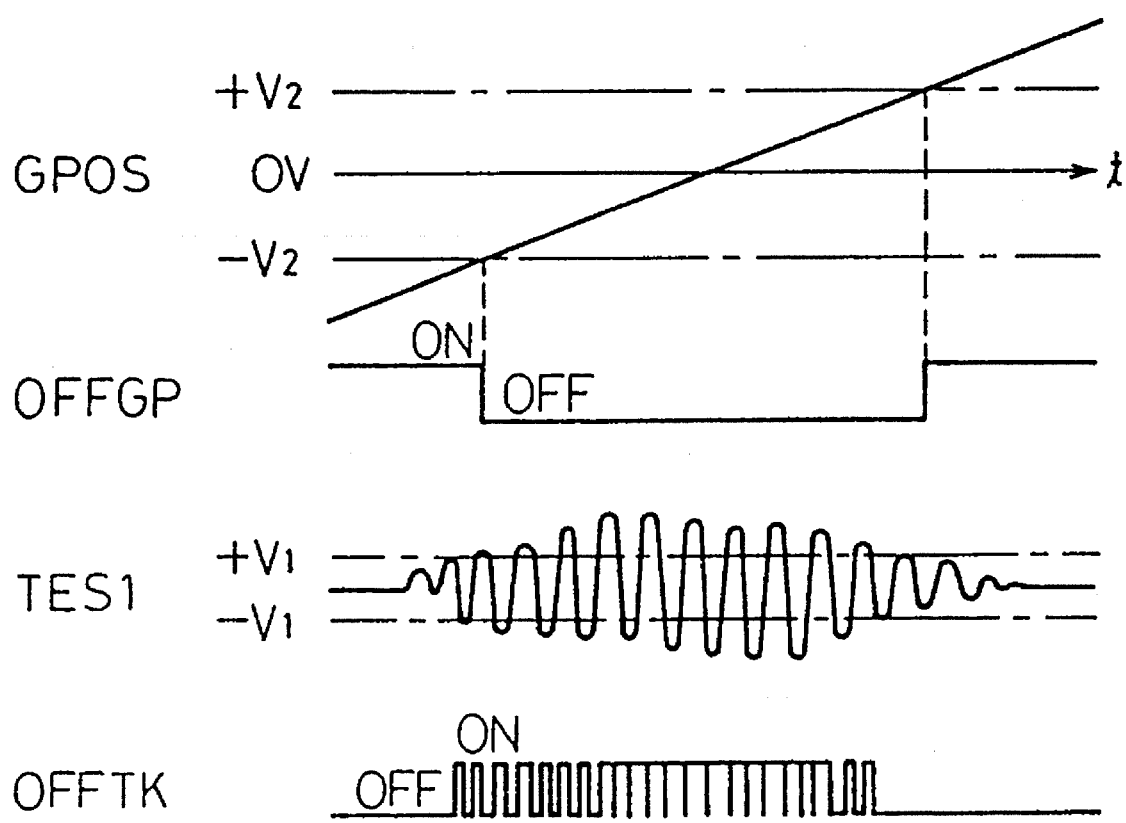
FIG. 24 is a view showing signal waveforms with a deflected galvanomirror, according to the invention of FIG. 21.

FIG. 24 shows signal waveforms at various portions of the embodiment of FIG. 23 with the galvanomirror being turned at a constant speed from one maximum turn position to the other maximum turn position.

The galvanomirror position signal GPOS linearly changes from a negative side toward a positive side according to a change of time t. This galvanomirror position signal GPOS is provided to the second abnormality detection circuit 300. When it is within the threshold voltage ±V2 of the comparators 302 and 304, the abnormality detected signal OFFGP from the OR gate 306 is OFF. When it exceeds the range of ±V2, the abnormality detected signal OFFGP becomes ON.

As the galvanomirror moves away from its neutral position where the galvanomirror position signal GPOS is zero, the tracking error signal TES1 reduces its amplitude even under the same track error state and finally becomes zero. When the amplitude of the tracking error signal TES1 following the movement of the galvanomirror 20 is within the threshold voltage of ±V1 set in the comparators 202 and 204 of the first abnormality detection circuit 200 of FIG. 8, the OR gate 206 provides an ON pulse whose pulse width corresponds to the waveform of the signal. When the signal amplitude decreases into the range of ±V1, the output of the OR gate 206 changes to, for example, off level.

The processor 32 monitors the two abnormality detected signals OFFTK and OFFGP from the first and second abnormality detection circuits 200 and 300. If the two abnormality detected signals are each valid (abnormality detected state), it determines that the galvanomirror 20 has been abnormally deflected, and notifies a display panel or a higher controller of the abnormal deflection of the galvanomirror 20.

After determining the abnormal deflection of the galvanomirror 20, the processor 32 turns OFF the servo switch SW1 to disable the position servo loop for carrying out the tracking control of the read beam, and ON the servo switch SW2 to enable the position lock loop for the galvanomirror, thereby forcibly returning the galvanomirror 20 from the abnormally deflected position to the neutral position.

Figure 25:
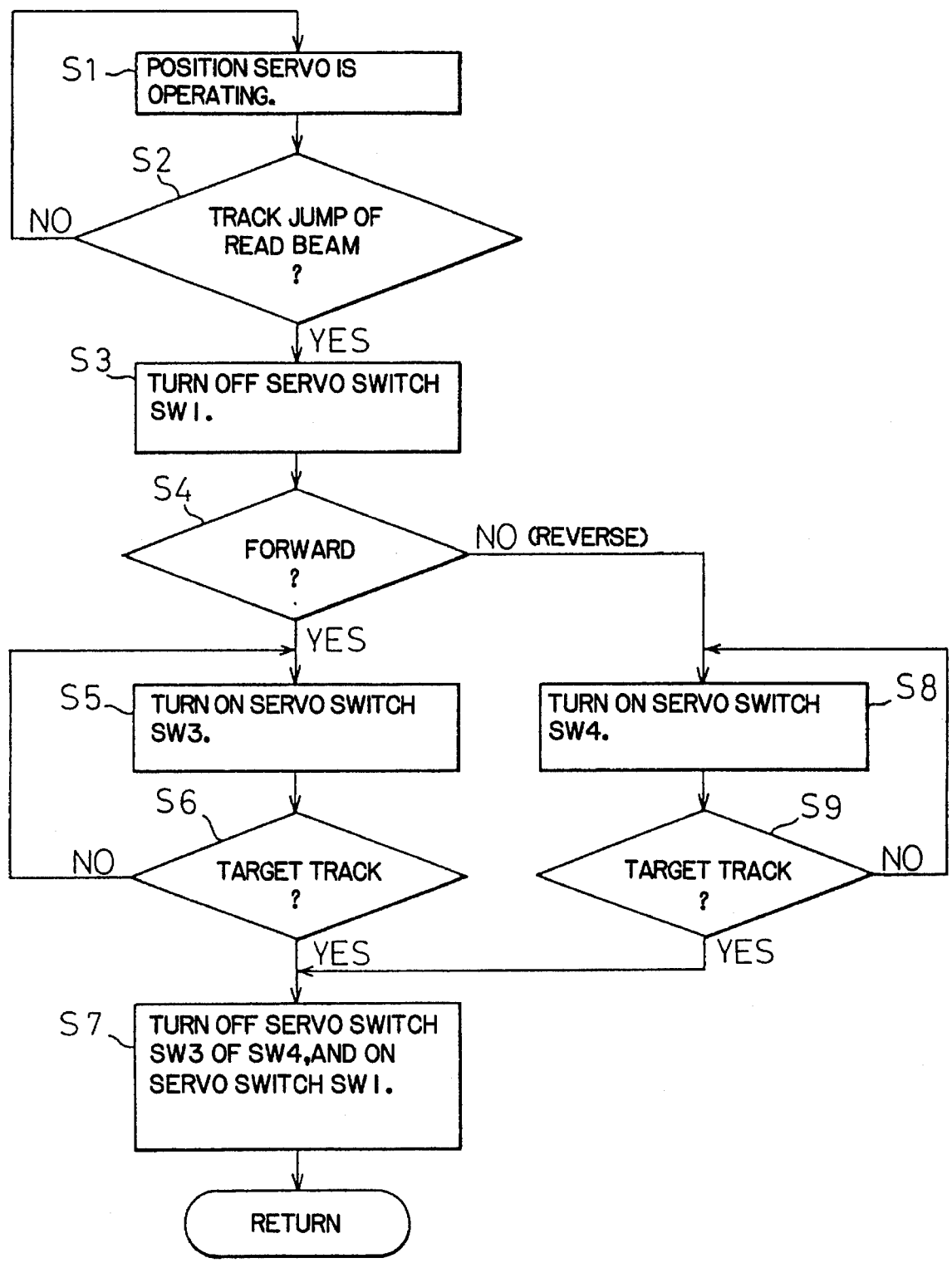
FIG. 25 is a flowchart showing an example of beam position control according to the invention of FIG. 21.

FIG. 25 is a flowchart showing an example of write beam position control carried out by the processor 32 according to the embodiment of FIG. 23. In this example, a seek instruction is provided during the tracking control of the read beam, to jump only the read beam across tracks.

Firstly, Step S1 (hereinafter, the word "Step" will be omitted) turns ON the servo switch SW1 and OFF the servo switch SW2 to enable the position servo loop for carrying out tracking control according to the tracking error signal TES1. Under this state, S2 monitors a track jump instruction for the read beam alone. If there is the track jump instruction for the read beam, S3 turns OFF the servo switch SW1 to disable the position servo control according to the tracking error signal TES1. S4 checks to see whether the track jump is in a forward direction or in a reverse direction. If it is in the forward direction, S5 turns ON the servo switch SW3 to forcibly add a control signal of +V to the position servo loop through the adder 132, thereby driving the galvanomirror 20 through open loop control to move the read beam to a target track. S6 checks to see whether or not the read beam has reached the target track. Namely, S6 finds the number of tracks crossed by the beam according to the number of zero crossings of the tracking error signal TES1 of the read beam, and determines that the read beam has reached the target track when a difference relative to the target track becomes zero. When S6 determines that the beam has reached the target track, S7 turns OFF the servo switch SW2 and ON the servo switch SW1 to start the position servo loop for carrying out the tracking control according to the tracking error signal TES1.

On the other hand, when S4 determines that the track jump is in the reverse direction, S8 turns ON the servo switch SW4 to start open loop control with the reverse control signal −V for driving the galvanomirror 20. When S9 determines that the beam has reached a target track, S7 turns OFF the servo switch SW4 and ON the servo switch SW1 to start the position servo loop for carrying out the tracking control according to the tracking error signal TES1.

Figure 26:
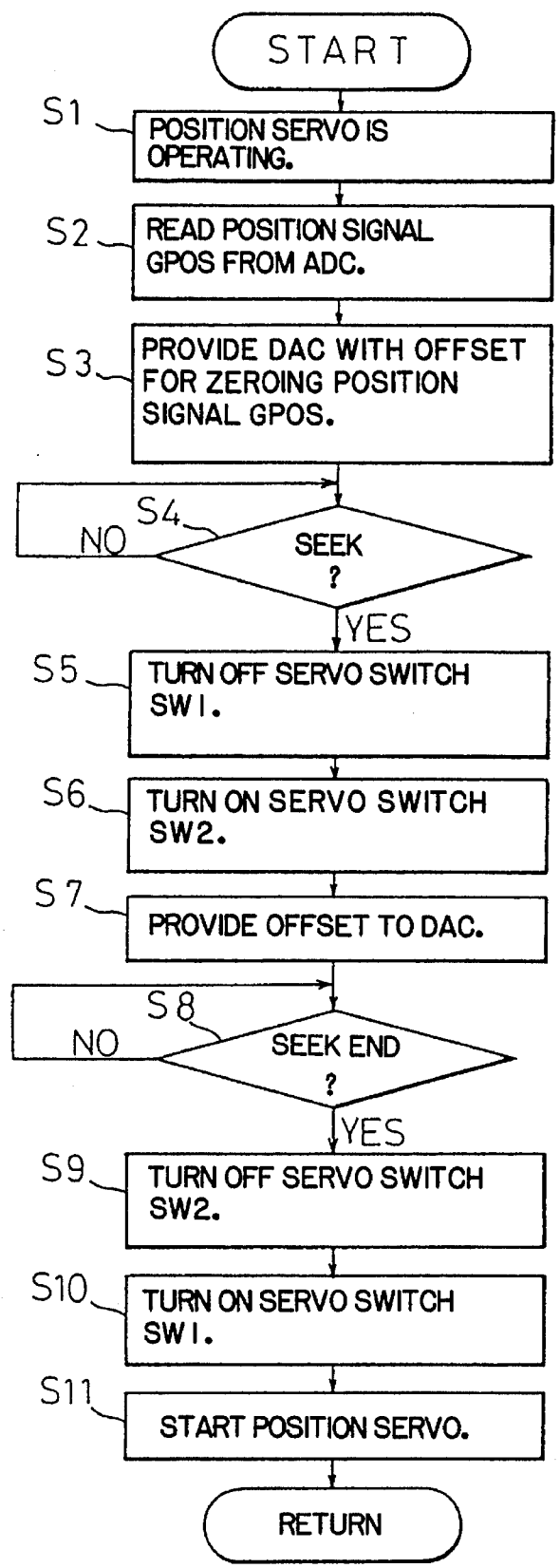
FIG. 26 is a flowchart showing another example of beam position control according to the invention of FIG. 21.

FIG. 26 is a flowchart showing another example of the beam position control of the invention. This example carries out beam position control with use of the functions of the AD converter 138, DA converter 140, and adder 136 of the position lock loop of FIG. 23.

In FIG. 26, S1 is activating the position servo loop for carrying out the tracking control according to the tracking error signal TES1 with the servo switch SW1 being ON and SW2 OFF. Under this state, S2 makes the processor 32 read the galvanomirror position signal GPOS through the AD converter 138. S3 provides offset data to the DA converter 140, which provides the offset signal GLK to the adder 136 so that the galvanomirror position signal GPOS provided from the adder 136 is zeroed.

S4 checks to see whether or not there is an instruction to carry out a seek operation with the write beam. If there is the instruction of the seek operation with the write beam, S5 turns OFF the servo switch SW1, and S6 turns ON the servo switch SW2. Namely, the position servo loop according to the tracking error signal TES1 is disabled and the position lock loop according to the galvanomirror position signal GPOS enabled during the seek operation. With the galvanomirror 20 being kept substantially at the same position as when the position servo being ON, the lens actuator is driven to carry out the seek operation with the write beam. During this seek operation, S7 of the invention sets the offset data obtained in S2 and S3 into the DA converter 140, so that the adder 136 adds the same to the position lock loop. Accordingly, the position of the galvanomirror 20 is locked to an offset state according to the offset signal GLK during the seek operation.

When S8 determines that the seek operation with the write beam has been completed, S9 turns OFF the servo switch SW2, and S10 turns ON the servo switch SW1. Then, S11 starts the position servo loop for carrying out the tracking control according to the tracking error signal TES1.

According to the beam position control of FIG. 26, the offset signal for zeroing the galvanomirror position signal GPOS used for the tracking control is applied to the position lock loop during the seek operation with the write beam, so that the galvanomirror is offset to a zero point position of the tracking error signal. Accordingly, the position servo loop according to the tracking error signal of the read beam is enabled after the completion of the seek operation of the write beam, and the read beam is positioned on a target track at an accuracy of within about one fourth of a track according to the offset control by the position lock loop. As a result, the servo control can be correctly carried out under an on-track state after the completion of the seek operation.

Other than the position control of the read beam by driving the galvanomirror 20 with a combination of the position servo loop and position lock loop shown in FIGS. 25 and 26, the position of the beam may be controlled by a proper combination of two servo loops.

As explained above, this aspect of the invention provides an optical disk unit that surely detects a read beam control abnormality such as an abnormal deflection of a galvanomirror, to thereby improve reliability.

Figure 30:
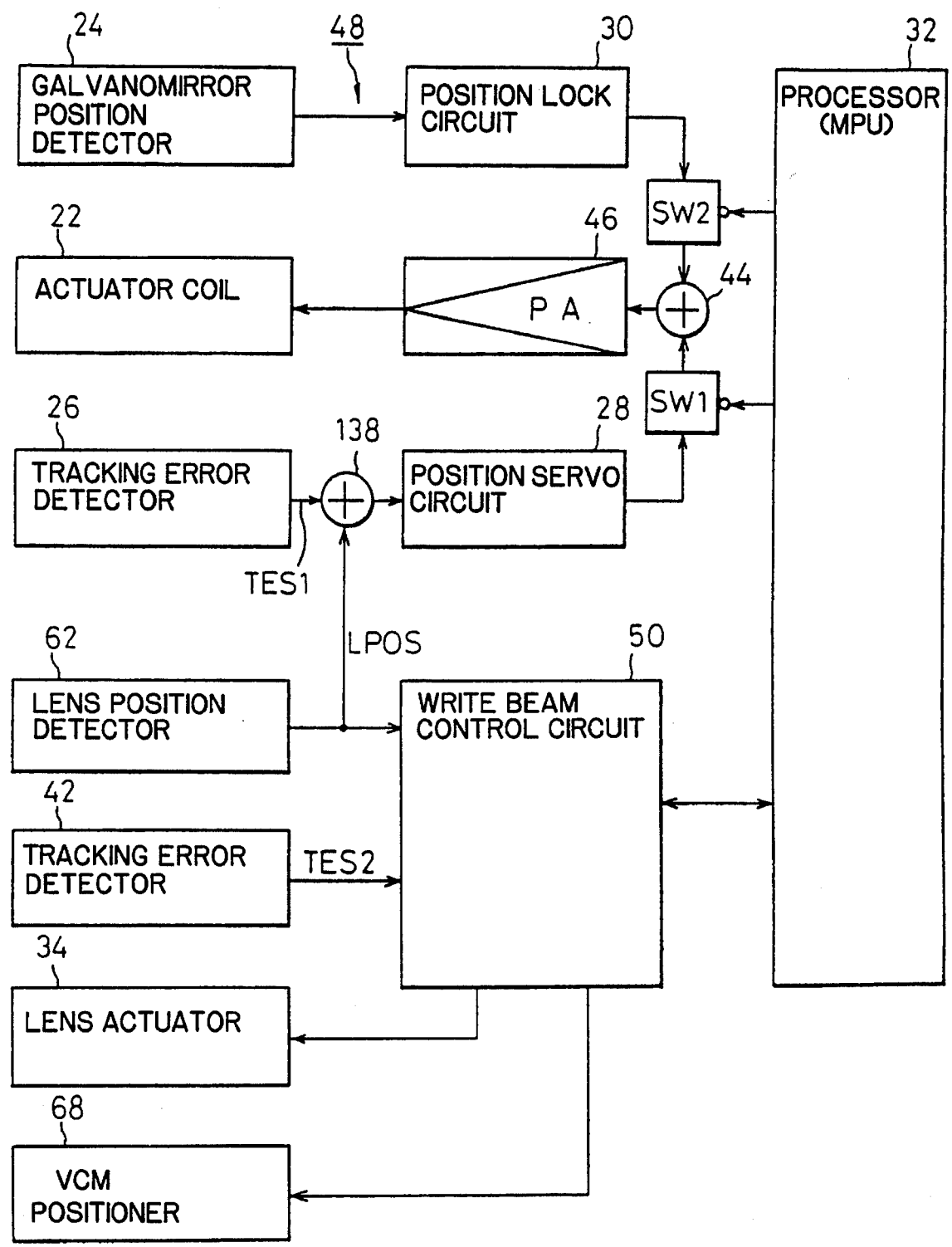
FIG. 30 is an explanatory view showing a two-beam control system.

Lastly, still another aspect of the invention shown in FIG. 27 will be explained. Before the explanation, the problems of the two-beam control system will be further explained with reference to FIGS. 15 and 30. FIG. 30 is a schematic view showing the conventional two-beam control system. In FIG. 30, a read beam control portion 48 includes a position servo loop for carrying out tracking control of a read beam 12 according to a tracking error signal TES1. This loop comprises a tracking error detector 26, a position servo circuit 28, an adder 44, a power amplifier 46, and an actuator coil 22.

A galvanomirror position lock loop for keeping the galvanomirror 20 at its neutral position according to the position signal of the galvanomirror 20 comprises a position detector 24, a position lock circuit 30, the adder 44, the power amplifier 46, and the actuator coil 22. This loop locks the galvanomirror 20 at the neutral position (a zero point position of the signal GPOS) even if there is disturbing vibration during a seek operation with the read beam 12.

A write beam control circuit 50 carries out tracking control of the write beam 14 by driving the lens actuator 34 according to a tracking error signal TES2 from the tracking error detector 42, a seek operation with the write beam by driving the lens actuator 34 or a VCM positioner 68, and lens position lock control for keeping the lens actuator 34 at its neutral position according to a lens position signal LPOS from a lens position detector 62.

The tracking error detector 26 detects the tracking error signal TES1 from a return beam of the read beam according to the push-pull method. The light receiving portions of the two-piece photosensor of the detector 26 are symmetrically arranged on each side of a track center. When the lens actuator 34 turns the object lens 10 from its neutral position, the symmetry of the two-piece photosensor with respect to the track center is broken to cause an offset in the tracking error signal TES1. As shown in FIG. 30, this offset may be corrected by the offset correction adder 138 for adding the lens position signal LPOS from the lens position detector 62.

A deflection of the galvanomirror 20 also causes an offset in the tracking error signal TES1. This offset is fairly larger than the offset caused by the lens actuator 34. When the read beam 12 is moved across several tracks independently of the write beam 14, the offset due to the deflection of the galvanomirror 20 may cause the read beam 12 to be off-track.

To solve the above-mentioned problem, an object of this aspect of the invention is to remove an offset in the read beam due to a deflection of the galvanomirror, thereby improving tracking reliability.

Figure 27:
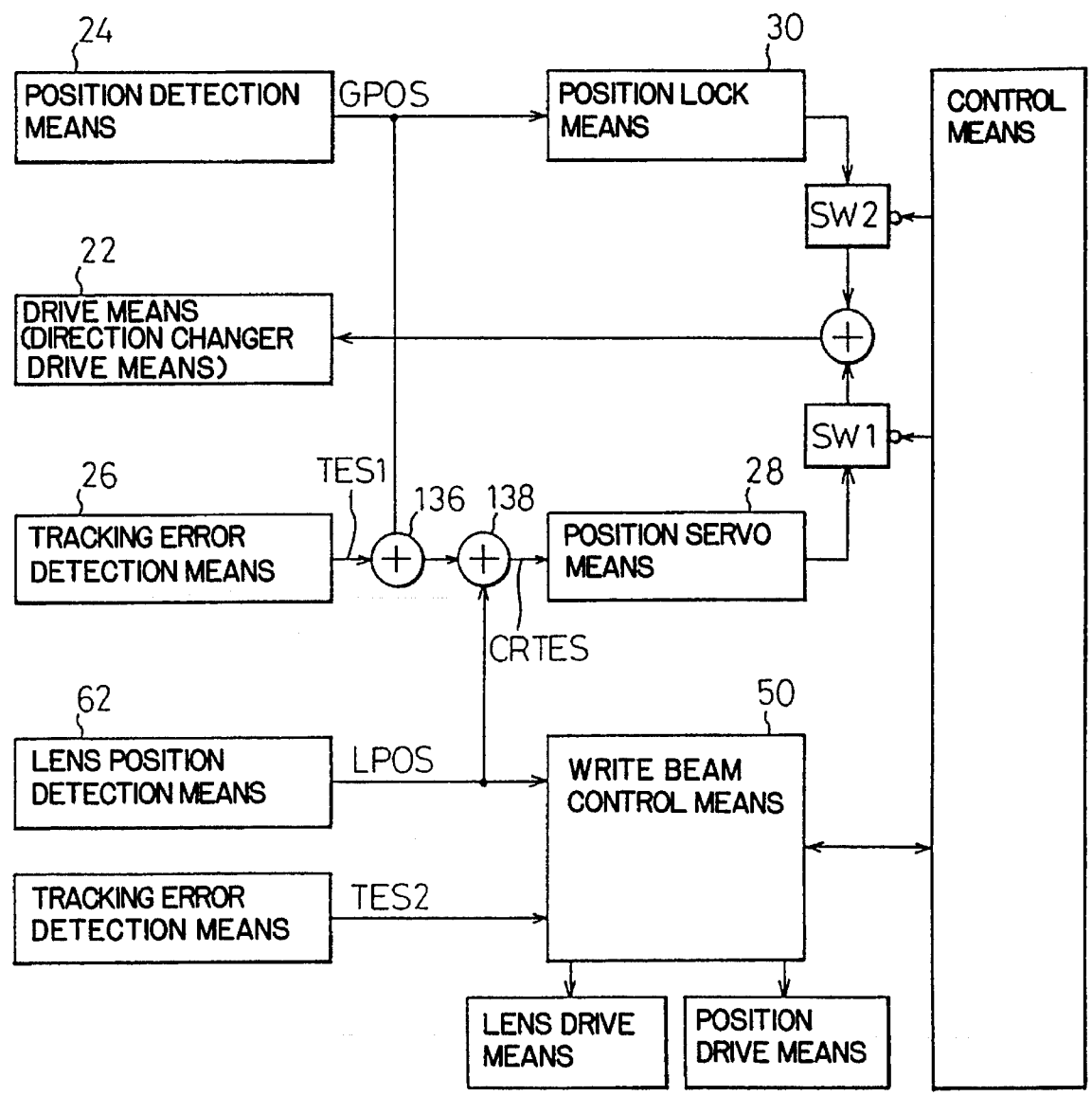
FIG. 27 is an explanatory view showing a principle of still another aspect of the invention.

FIG. 27 is an explanatory view showing a principle of this aspect of the invention.

This aspect of the invention is applicable for an optical disk unit having lens position detection means 62 for detecting a position signal LPOS of an object lens 10; and write beam control means 50 for driving the lens and/or a positioner according to a tracking error detection signal TES2 of a write beam 14 and the lens position signal LPOS, to control the position of the write beam 14. A read beam control system according to the invention for such an optical disk unit comprises first offset correction means 136 for adding a galvanomirror position signal GPOS to a tracking error signal TES1 of a read beam 12.

Second correction means 138 may be disposed for adding the write beam lens position signal LPOS to the output of the first offset correction means 136. The main beam 14 is a write beam, and the subbeam 12 is a read beam.

The read beam control system according to the invention for the optical disk unit surely removes an offset caused in the tracking error signal of the subbeam due to a deflection of the galvanomirror, to surely prevent an off-track of the subbeam when the subbeam is moved by the galvanomirror to a position a required number of tracks away from the write beam.

Figure 28:
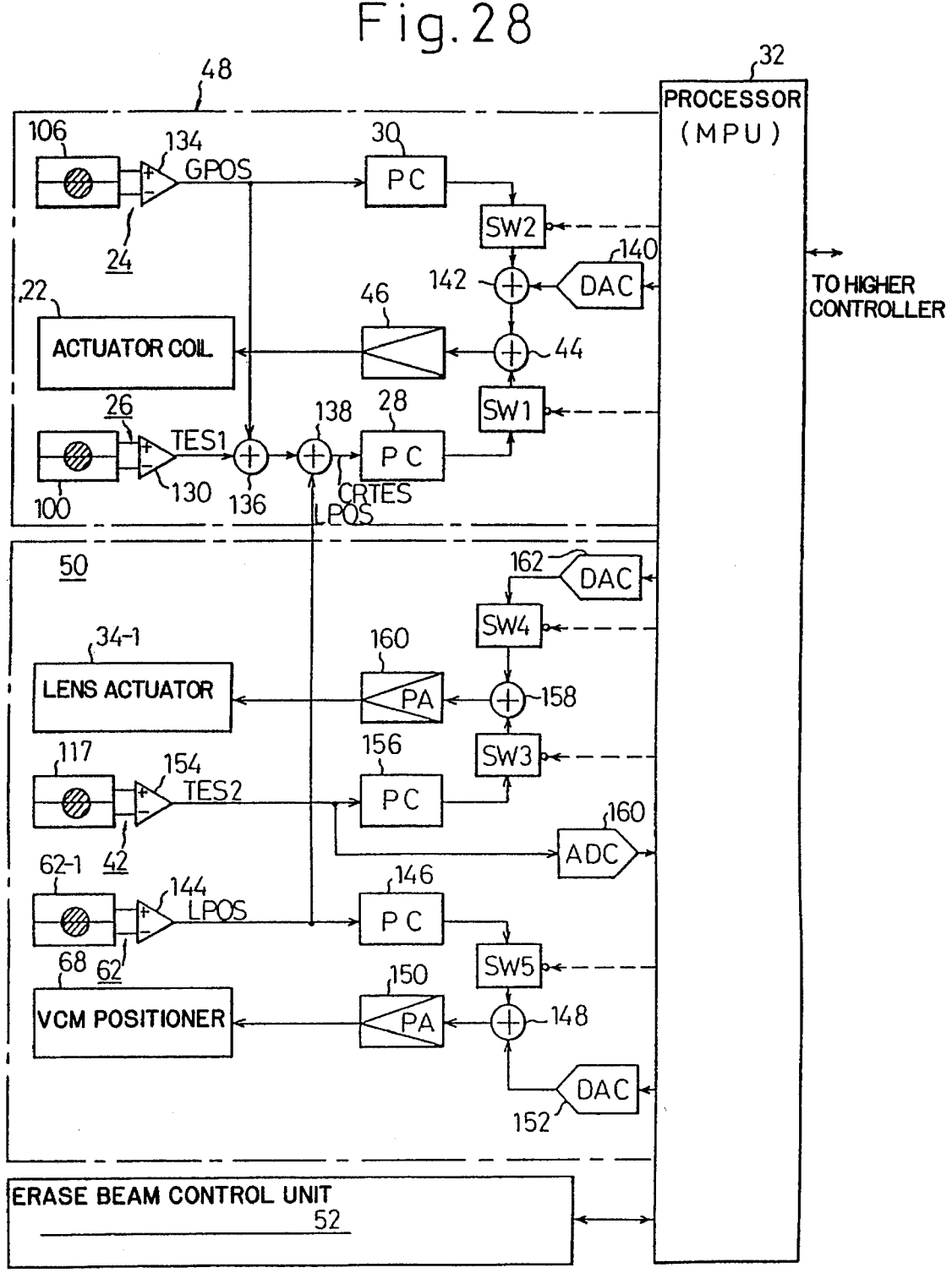
FIG. 28 is a schematic view showing an embodiment of the invention of FIG. 27.

FIG. 28 is a schematic view showing an optical disk unit having an arrangement for correcting an offset of the tracking error signal TES1 obtained from the read beam according to the invention.

The embodiment of FIG. 28 uses the write beam, read beam, and an erase beam. For these beams, there are arranged a read beam control portion 48, a write beam control portion 50, and an erase beam control portion 52, respectively.

The read beam control portion 48 includes a position servo loop for carrying out tracking control of the read beam 12, and a galvanomirror position lock loop for holding the galvanomirror 20 at a neutral position, the galvanomirror serving as beam direction change means for changing and controlling the position of the read beam.

The position servo loop for carrying out the tracking control of the read beam comprises a tracking error detector 26, a first offset correction adder 136, a second offset correction adder 138, a phase compensation circuit (PC circuit) 28, a servo switch SW1, an adder 44, a power amplifier 46, and the actuator coil 22. Here, the actuator coil 22 corresponds to the galvanomirror drive means serving as the direction changer drive means shown in the principle view of FIG. 27.

The tracking error detector 26 comprises a two-piece photosensor 100 and a subtracter 130, and provides the tracking error signal TES1 from a return beam of the write beam according to the far field method. A galvanomirror position signal GPOS to be explained later is supplied to the first offset correction adder 136. A lens position signal LPOS from the write beam control portion 50 is supplied to the second offset correction adder 138. The phase compensation circuit 28 increases the gain of a high-band region of a servo band, to carry out advancing phase compensation. The servo switch SW1 is turned ON at the time of tracking control of the read beam, and OFF at the time of a seek operation of the beam.

The galvanomirror position lock loop for holding the galvanomirror 20 at its neutral position comprises the position detector 24, a phase compensation circuit 30, a servo switch SW2, an adder 142, the adder 44, the power amplifier 46, and the actuator coil 22. The position detector 24 comprises a two-piece photosensor 106 and a subtracter 134, and provides the galvanomirror position signal GPOS having characteristics shown in FIG. 6. The servo switch SW2 is turned ON at the time of the tracking control, and OFF at the time of the seek operation. An output of a DA converter 140 is applied to the adder 142, which provides, for example, an offset signal for positioning the read beam at a different position from the write beam.

The write beam control portion 50 has a position servo loop for carrying out tracking control of the write beam by a lens actuator 34-1, and a position lock loop for holding the lens actuator at its neutral position by driving a VCM positioner 68.

The position servo loop for carrying out the tracking control of the write beam comprises the tracking error detector 42, a phase compensation circuit 156, a servo switch SW3, an adder 158, a power amplifier 160, and the lens actuator 34-1. The tracking error detector 42 comprises a two-piece photosensor 117 and a subtracter 154, and detects a tracking error signal TES2 from a return beam of the write beam 14 according to the push-pull method. The servo switch SW3 is turned ON at the time of the tracking control of the write beam, and OFF at the time of a seek operation of the beam. An output of a DA converter 162 for a lens seek operation is applied to the adder 158 through a servo switch SW4. Namely, at the time of the lens seek operation, the servo switch SW3 is turned OFF and the servo switch SW4 ON, and the processor 32 provides a lens seek signal to the lens actuator 34-1 through the DA converter 162, to carry out the lens seek operation by controlling a speed.

The position lock loop (double servo) carried out with the VCM positioner 68 for maintaining the lens actuator at the neutral position comprises the lens position detector 62, a phase compensation circuit 146, a servo switch SW5, an adder 148, a power amplifier 150, and the VCM positioner 68. The lens position detector 62 comprises a two-piece photosensor 62-1 and a subtracter 144, and provides the lens position signal LPOS having similar characteristics to the signal shown in FIG. 6. The servo switch SW5 is turned ON at the time of tracking control, and OFF at the time of a seek operation. An output of a DA converter 152 is supplied to the adder 148. The DA converter 152 is used for a positioner seek operation. At the time of the positioner seek operation, the servo switch SW5 is turned OFF, and the processor 32 provides the VCM positioner 68 with a positioner seek signal through the DA converter 152, to carry out the positioner seek operation.

A lens actuator 34-2 used exclusively for the erase beam in the erase beam control portion 52 is provided with the same control system as that for the lens actuator 34-1 of the write beam control portion 50.

As is apparent in the embodiment of FIG. 28, the first offset correction adder 136 adds the galvanomirror position signal GPOS from the galvanomirror position detector 24 to the tracking error signal from the tracking error detector 26 of the read beam control portion 48, to remove an offset in the tracking error signal TES1 caused by a deflection of the galvanomirror 20.

Figure 29:
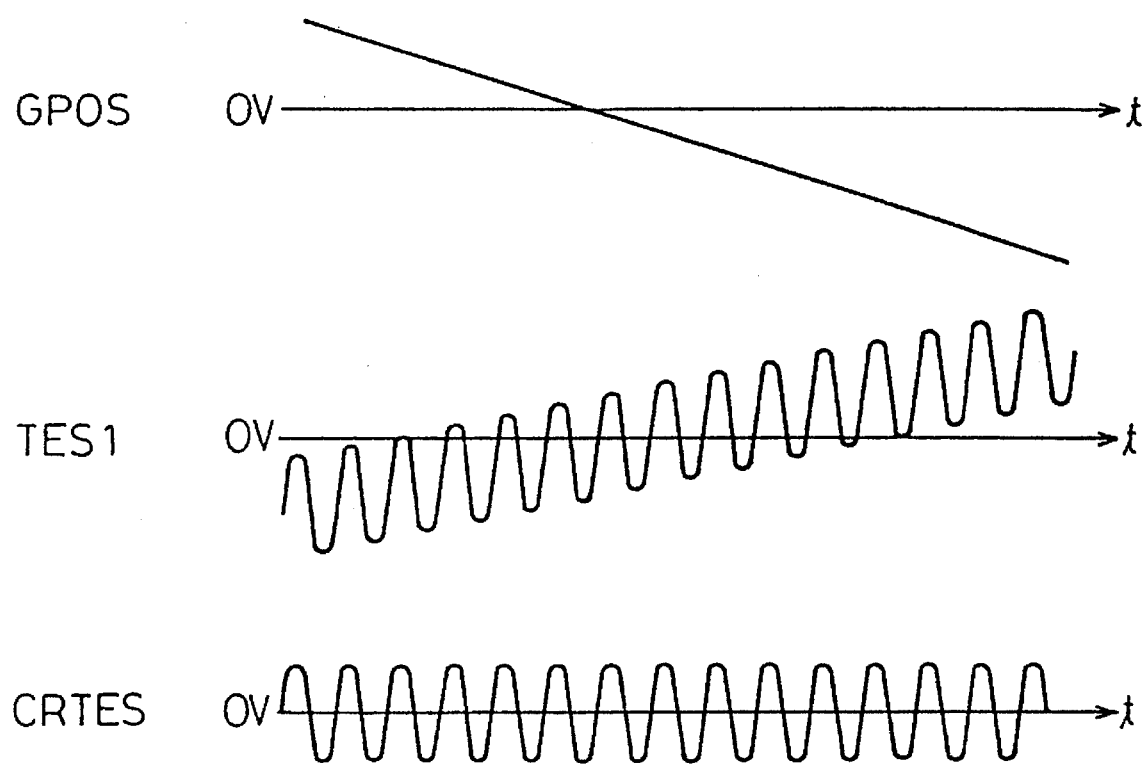
FIG. 29 is an explanatory view showing an offset process according to the invention of FIG. 27.

FIG. 29 explains an offset process with the galvanomirror 20 being turned at a constant speed for a given time. The figure shows the galvanomirror position signal GPOS, tracking error detected signal TES1, and a corrected tracking error detected signal CRTES.

In FIG. 29, the galvanomirror position signal GPOS is zero at the neutral position of the galvanomirror 20. At this position, an offset in the tracking error signal TES1 is substantially zero. When the galvanomirror 20 is deflected so that the galvanomirror position signal GPOS is changed linearly from a positive side to a negative side, an offset of the tracking error signal RTES changes opposite to the change in the galvanomirror position signal GPOS.

Accordingly, the first offset correction adder 136 of FIG. 28 of the invention adds the galvanomirror position signal GPOS to the tracking error signal TES1, to provide the offset corrected signal CRTES from which the offset caused by the deflection of the galvanomirror has been removed.

According to the embodiment of FIG. 28, the second offset correction adder 138 adds the lens position signal LPOS of the lens actuator 34-1 detected by the lens position detector 62, to remove an offset of the offset error detected signal TES1 of the read beam caused by a rotational movement of the lens actuator 34-1, i.e., the object lens 10-1.

The invention is not limited to the embodiment of FIG. 28. A system having at least the means for adding the galvanomirror position signal GPOS to the tracking error signal TES1 of the read beam, to correct an offset caused by a deflection of the galvanomirror 20 is applicable as it is for an optical disk unit of optional configuration.

The medium employed by the above embodiments is the magneto-optic disk. This invention is also applicable for an optical disk that records data by forming physical pits.

As explained above, this aspect of the invention can carry out tracking control of a read beam by deflecting a galvanomirror while removing an offset in a tracking error signal caused by the deflection of the galvanomirror by adding a galvanomirror position signal to the tracking error signal, thereby preventing an off-track of the read beam and improving reliability.

A beam control system of an optical disk unit according to the invention employs a galvanomirror for independently carrying out tracking control of a read beam or a write beam, when passing the write and read beams through a single object lens to irradiate a medium with the beams to simultaneously write and read the medium. This system is applicable for various industrial fields.

We claim:

1. An optical disk unit comprising:

an optical head for writing data to a medium with a write beam and reading data from a medium with a read beam;

lens drive means for driving an object lens to simultaneously move the read and write beams across tracks of the medium;

direction change means for changing the direction of at least one of the read and write beams;

direction changer drive means for driving said direction change means to move one of the read and write beams across tracks of the medium;

position detection means for detecting a position of said direction changing means and providing a position signal;

tracking error detection means for detecting and providing a tracking error signal according to a return beam from the medium;

position servo means for driving said direction change means according to the tracking error signal, to carry out tracking control of one of the read and write beams; and position lock means for locking said direction change means at a predetermined position according to the position signal;

a beam position control system, comprising:

a first servo switch for starting and stopping a position servo operation of said position servo means;

a second servo switch for starting and stopping a position lock operation of said position lock means; and control means for turning ON and OFF said first and second servo switches according to a beam position control status and for enabling one combination of one of the position servo operation and the position lock operation, both of the position servo operation and the position lock operation, and neither of the position servo operation and the position lock operation.

2. A beam position control system of an optical disk unit according to claim 1, wherein said control means turns OFF said first servo switch to disable the position servo operation and turns ON said second servo switch to enable the position lock operation.

3. A beam position control system of an optical disk unit according to claim 1, wherein, when a seek operation with one of the read and write beams is completed and one of the read and write beams are set on a target track, said control means turns ON said first and second servo switches to enable both the position servo operation and the position lock operation, and after one of the read and write beams is set on the target track, said control means turns OFF said second servo switch to enable only the position servo operation.

4. A beam position control system of an optical disk unit according to claim 1, wherein, when only the write beam is jumped across tracks during the position servo operation of the read beam said control means turns OFF said first servo switch until the jump is completed, to disable both the position servo operation of the read beam and the position lock operation and to leave said direction change means uncontrolled.

5. A beam position control system of an optical disk unit according to claim 1, further comprising:

a third servo switch for applying a forward drive signal to said direction changer drive means and a fourth servo switch for applying a reverse drive signal to the same, wherein:

said control means turns OFF said first servo switch, when only the read beam is jumped across tracks during the position servo operation of the read beam to disable both the position servo operation and the position lock operation, and said control means controls one of said third servo switch and said fourth servo switch.

6. A beam position control system of an optical disk unit according to claim 1, wherein said control means:

turns ON said first servo switch to carry out the position servo operation of the read beam, fetches, during this operation, the position signal from said position detection means, and finds an offset signal for zeroing the position signal;

turns OFF said first servo switch, when only the write beam is jumped across tracks, to disable the position servo operation of the read beam until the jump is completed, and at the same time, applies the offset signal to lock said direction change means at an offset state; and turns OFF said second servo switch and turns ON said first servo switch after the completion of the track jump, to resume the position servo operation.

7. A beam position control system of an optical disk unit according to claim 1, further comprising:

a third servo switch for applying a forward drive signal to said direction changer drive means; and a fourth servo switch for applying a reverse drive signal to said direction changer drive means, wherein, when a higher device provides said control means with a seek instruction indicating differences for positional deviations of the read beam and the write beam, the difference for positional deviation of the write beam specified in the seek instruction is zero, and wherein said control means turns OFF said first servo switch to disable both the position servo operation of the read beam and the position lock operation, and controls one of said third servo switch and said fourth servo switch.

8. A beam position control system of an optical disk unit according to claim 1, wherein, when a higher device provides said control means with a seek instruction indicating differences for positional deviations of the read beam and the write beam, the difference for the write beam specified in the seek instruction being greater than zero, said control means fetches the position signal from said position detection means during said position servo operation of the read beam with said first servo switch being ON, finds an offset signal with which the position signal is unchanged under a position locked state, and adds an offset corresponding to a difference between the read beam and the write beam to the offset signal to form an offset signal for a new lock position;

turns OFF said first servo switch to disable the position servo operation of the read beam during a track jump of the write beam, and applies the offset signal to lock the position of said direction change means at an offset state; and turns OFF said second servo switch after the completion of the track jump, and turns ON said first servo switch to resume the position servo operation.

9. An optical disk unit comprising:

an object lens;

an optical head for passing at least two beams including a write beam and a read beam through said object lens, and simultaneously writing and reading data to and from a medium with a plurality of the beams;

lens drive means for driving said object lens to simultaneously move a plurality of the beams across tracks of the medium;

a galvanomirror;

galvanomirror drive means for driving said galvanomirror to move only the read beam across tracks of the medium;

position detection means for detecting the position of said galvanomirror and providing a galvanomirror position signal;

tracking error detection means for detecting and providing a tracking error signal according to a return beam of the read beam from the medium;

position servo means for driving said galvanomirror according to the tracking error signal, to carry out tracking control of the read beam;

position lock means for locking said galvanomirror at a predetermined position according to said galvanomirror position signal;

a first servo switch turned ON for tracking control of the read beam and enabling said position servo means; and a second servo switch turning ON when the tracking control of the read beam is disabled, and enabling said position lock means, a read beam control system comprising:

offset addition means for adding an offset signal to said galvanomirror position signal provided by said position detection means; and control means for turning ON said servo switch for enabling the position lock control of said galvanomirror when the unit is energized or retried, reading said galvanomirror position signal, finding the offset signal for zeroing the galvanomirror position signal, and providing the offset signal to said offset addition means during a seek operation with the write beam.

10. An optical disk unit comprising:

an optical head for writing and reading data to and from a medium with write and read beams, respectively;

lens drive means for driving an object lens to simultaneously move the write and read beams across tracks of the medium;

a direction change means for changing direction of at least one of the write and read beams;

direction changer drive means for driving said direction change means to move one of the write and read beams across the tracks of the medium;

position detection means for detecting the position of said direction change means and providing a position signal;

tracking error detection means for detecting and providing a tracking error signal according to a return beam from the medium;

position servo means for driving said direction change means according to the tracking error signal, to carry out tracking control of one of the write and read beams; and position lock means for locking said direction change means at a predetermined position according to the positional signal;

a beam position control system, comprising:

a first servo switch for starting and stopping a position servo operation of said position servo means;

a second servo switch for starting and stopping a position lock operation of the position lock means;

control means for turning ON and OFF said first and second servo switches according to a beam position control status, to enable one combination of one of the position servo operation and the position lock operation, both of the position servo operation and the position lock operation, and neither of the position servo operation and position lock operation;

first abnormality detection means for detecting an abnormality in the tracking error signal and notifying said control means of the abnormality; and second abnormality detection means for detecting an abnormality in the position signal of said direction change means and notifying said control means of the abnormality.

11. A beam position control system of an optical disk unit according to claim 10, wherein, when receiving the abnormality notices from said first and second abnormality detection means, said control means turns OFF said first servo switch to disable the tracking control of one of the write and read beams, and turns ON said second servo switch to carry out position lock control for returning said direction change means to a predetermined position.

12. An optical disk unit comprising:

an optical head for writing data to a medium with a write beam and reading data from a medium with a read beam;

lens drive means for driving an object lens to simultaneously move the read and write beams across tracks of the medium;

direction change means for changing the direction of at least one of the read and write beams;

direction changer drive means for driving said direction change means to move one of the read and write beams across tracks of the medium;

position detection means for detecting a position of said direction changing means and providing a position signal;

tracking error detection means for detecting and providing a tracking error signal according to a return beam from the medium;

position servo means for driving said direction change means according to the tracking error signal, to carry out tracking control of one of the read and write beams;

position lock means for locking said direction change means at a predetermined position according to the position signal; and a beam position control system, comprising:
  a first servo switch for starting and stopping a position servo operation of said position servo means;
  a second servo switch for starting and stopping a position lock operation of said position lock means;
  a third servo switch for applying a forward drive signal to said direction changer drive means;
  a fourth servo switch for applying a reverse drive signal to said direction changer drive means; and
  control means for turning ON and OFF said first and second servo switches according to a beam position control status and for enabling one combination of one of the position servo operation and the position lock operation, both of the position servo operation and the position lock operation, and neither of the position servo operation and the position lock operation, said control means turning OFF said first servo switch when only the read beam is jumped across tracks during the position servo operation of the read beam to disable both the position servo operation and the position lock operation, and said control means controlling one of said third servo switch and said fourth servo switch.

13. An optical disk unit comprising:

an optical head for writing data to a medium with a write beam and reading data from a medium with a read beam;

lens drive means for driving an object lens to simultaneously move the read and write beams across tracks of the medium;

direction change means for changing the direction of at least one of the read and write beams;

direction changer drive means for driving said direction change: means to move :one of the read and write beams across tracks of the medium;

position detection means for detecting a position of said direction changing means and providing a position signal;

tracking error detection means for detecting and providing a tracking error signal according to a return beam from the medium;

position servo means for driving said direction change means according to the tracking error signal, to carry out tracking control of one of the read and write beams; and position lock means for locking said direction change means at a predetermined position according to the position signal;

a beam position control system, comprising:
  a first servo switch for starting and stopping a position servo operation of said position servo means;
  a second servo switch for starting and stopping a position lock operation of said position lock means; and
  control means for turning ON and OFF said first and second servo switches according to a beam position control status, and for enabling one combination of one of the position, servo operation and the position lock operation, both of the position servo operation and the position lock operation, and neither of the position servo operation and the position lock operation, said control means turning ON said first servo switch to carry out the position servo operation of the read beam, fetching, during this operation, the position signal from said position detecting means and finding an offset signal for zeroing the position signal, said control means turning OFF said first servo switch when only the write beam is jumped across tracks, to disable the position servo operation of the read beam until the jump is completed, and at the same time, applying the offset signal to lock said direction change means at an offset state, and said control means turning OFF said second servo switch and turning ON said first servo switch after the completion of the track jump, to resume the position servo operation.

14. An optical disk unit comprising:

an optical head for writing data to a medium with a write beam and reading data from a medium with a read beam;

lens drive means for driving an object lens to simultaneously move the read and write beams across tracks of the medium;

direction change means for changing the direction of at least one of the read and write beams;

direction changer drive means for driving said direction change means to move one of the read and write beams across tracks of the medium;

position detection means for detecting a position of said direction changing means and providing a position signal;

tracking error detection means for detecting, and providing a tracking error signal according to a return beam from the medium;

position servo means for driving said direction change means according to the tracking error signal, to carry out tracking control of one of the read and write beams; and position lock means for locking said direction change means at a predetermined position according to the position signal;

a beam position control system, comprising:
  a first servo switch for starting and stopping a position servo operation of said position servo means;
  a second servo switch for starting and stopping a position lock operation of said position lock means;
  a third servo switch for applying a forward drive signal to said direction changer drive means;
  a fourth servo switch for applying a reverse drive signal to said direction changer drive means, when a higher device provides said control means with a seek instruction indicating differences for positional deviations of the read beam and the write beam, the difference for positional deviation of the write beam specified in the seek instruction is zero; and control means for turning ON and OFF said first and second servo switches according to abeam position control,status, and for enabling one combination of one of the position servo operation and the position lock operation, both of the position servo operation and the position lock, operation and neither of the position servo operation and the position lock operation, said control means turning OFF said first servo switch to disable both the position servo operation of the read beam and the position lock operation, and controlling one of said third servo switch and said fourth servo switch.

15. An optical disk unit comprising:

an optical head for writing data to a medium with a write beam and reading data from a medium with a read beam;

lens drive means for driving an object lens to simultaneously move the read and write beams across tracks of the medium;

direction change means for changing the direction of at least one of the read and write beams;

direction changer drive means for driving said direction change means to move one of the read and write beams across tracks of the medium;

position detection means for detecting a position of said direction changing means and providing a position signal;

tracking error detection means for detecting and providing a tracking error signal according to a return beam from the medium;

position servo means for driving said direction change means according to the tracking error signal to carry out tracking control of one of the read and write beams; and position lock means for locking said direction change means at a predetermined position according to the position signal;

a beam position control system comprising:
 a first servo switch for starting and stopping a position servo operation of said position servo means;
 a second servo switch for starting and stopping a position lock operation of said position lock means; and
 control means for turning ON and OFF said first and second servo switches according to a beam position control status, and for enabling one combination of one of the position servo operation and the position lock operation, both of the position servo operation and the position lock operation, and neither of the position servo operation and the position lock operation, when a higher device provides said control means with a seek instruction indicating differences for positional deviations of the read beam and the write beam, the difference for the write beam specified in the seek instruction being greater than zero, said control means fetching the position signal from said position detection means during said position servo operation of the read beam with said first servo switch being ON, finding an offset signal with .which the position signal is unchanged under a position locked state, and adding an offset corresponding to a difference between the read beam and the write beam to the offset signal to form an offset signal for a new lock position, turning OFF said first servo switch, to disable the position servo operation of the read beam during a track jump of the write beam and applying the offset signal to lock the position of said direction change means at an offset state, and turning OFF said second servo switch after the completion of the track jump and turning ON said first servo switch to resume the position operation.

16. An optical disk unit comprising:

an optical head for Writing and reading data to and from a medium with write and read beams, respectively;

lens drive means for driving an object lens to simultaneously move the write and read beams across tracks of the medium;

direction change means for changing direction of at least one of the write and read beams;

direction changer drive means for driving said direction change means to move one of the write and read beams across the tracks of the medium;

position detection means for detecting the position of said direction change means and providing a position signal;

tracking error detection means for detecting and providing a tracking error signal according to a return beam from the medium;

position servo means for driving said-direction change means according to the tracking error signal, to carry out tracking control of one of the write and read beams; and position lock means for locking said direction change means at a predetermined position according to the positional signal;

a beam position control system, comprising:
 a first servo switch for starting and stopping a position servo operation of said position servo means; and
 a second servo switch for starting and stopping a position lock operation of said position lock means;

control means for turning ON and OFF said first and second servo switches according to a beam position control status, to enable one combination of one of the position servo operation and the position lock operation, both of the position servo operation and the position lock operation, and neither of the position servo operation and position lock operation;

first abnormality detection means for detecting an abnormality in the tracking error signal and notifying said control means of the abnormality; and second abnormality detection means for detecting an abnormality in the position signal of said direction change means and notifying said control means of the abnormality, when said beam position control system receives the abnormality notices from said first and second abnormality detection means, said control means turns OFF said first servo switch to disable the tracking control of one of the write and read beams, and turns ON said second servo switch to carry out position lock control for returning said direction change means to a predetermined position.

* * * * *

UNITED STATES PATENT AND TRADEMARK OFFICE
CERTIFICATE OF CORRECTION

PATENT NO. : 5,499,223
DATED : March 12, 1996
INVENTOR(S) : YANAGI et al.

It is certified that error appears in the above-indentified patent and that said Letters Patent is hereby corrected as shown below:

TITLE PAGE: [73] Assignees:

With regard to the second assignee, change "Company" to --Corporation--.

Col. 3, line 31, delete comma ",".

Col. 17, line 64, delete "conventional".

Col. 22, line 19, delete "conventional".

Col. 29, line 52 (claim 13, line 11), delete colons ":" (both occurrences).

Col. 31, line 2 (claim 14, line 41), change "abeam" to --a beam--;
line 3 (claim 14, line 42), change "control,status" to --control status--;
line 6 (claim 14, line 45), change "lock, operation" to --lock operation,--;
line 61 (claim 15, line 47), change "with.which" to --with which--.

Col. 32, line 2 (claim 15, line 52), change "switch," to --switch--;
line 11 (claim 16, line 2), change "Writing" to --writing--;
line 27 (claim 16, line 17), change "said-direction" to --said direction--.

Signed and Sealed this

Thirteenth Day of August, 1996

Attest:

BRUCE LEHMAN

*Attesting Officer*     *Commissioner of Patents and Trademarks*